United States Patent
Sugaya

(10) Patent No.: US 10,708,961 B2
(45) Date of Patent: Jul. 7, 2020

(54) COMMUNICATION DEVICE AND COMMUNICATION METHOD

(71) Applicant: SONY CORPORATION, Tokyo (JP)

(72) Inventor: Shigeru Sugaya, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/780,977

(22) PCT Filed: Sep. 16, 2016

(86) PCT No.: PCT/JP2016/077557
§ 371 (c)(1),
(2) Date: Jun. 1, 2018

(87) PCT Pub. No.: WO2017/110173
PCT Pub. Date: Jun. 29, 2017

(65) Prior Publication Data
US 2018/0368195 A1    Dec. 20, 2018

(30) Foreign Application Priority Data
Dec. 22, 2015  (JP) ................................ 2015-249972

(51) Int. Cl.
*H04L 12/26* (2006.01)
*H04W 76/11* (2018.01)
(Continued)

(52) U.S. Cl.
CPC ............. *H04W 76/11* (2018.02); *H04L 69/22* (2013.01); *H04L 69/323* (2013.01); *H04W 8/26* (2013.01);
(Continued)

(58) Field of Classification Search
USPC .... 370/236, 252, 328, 329, 330, 389, 395.3, 370/475
See application file for complete search history.

(56) References Cited

U.S. PATENT DOCUMENTS 9,414,269 B2 * 8/2016 Hole ..................... H04W 24/10
2004/0166897 A1   8/2004 Hamada
(Continued)

FOREIGN PATENT DOCUMENTS

EP          2509235 A2   10/2012
EP          3018969 A1    5/2016
(Continued)

OTHER PUBLICATIONS

Fischer, et al.,"CID 205 BSSID Color Bits", doc.: IEEE 802.11-13/1207r1, 20 pages.
(Continued)

*Primary Examiner* — Nguyen H Ngo
(74) *Attorney, Agent, or Firm* — Chip Law Group

(57) ABSTRACT

A communication device includes a communication unit that transmits a request signal for a wireless communication network identifier identified in a physical layer and receives a response signal by a wireless communication resource corresponding to the wireless communication network identifier after the transmission of the request signal. A communication device includes a communication unit that receives a request signal for a wireless communication network identifier identified in a physical layer and transmits a response signal by a wireless communication resource corresponding to the wireless communication network identifier after the reception of the request signal.

18 Claims, 20 Drawing Sheets

(51) Int. Cl.
*H04L 29/08* (2006.01)
*H04W 24/02* (2009.01)
*H04W 8/26* (2009.01)
*H04L 29/06* (2006.01)
*H04W 24/04* (2009.01)
*H04W 52/02* (2009.01)
*H04W 72/04* (2009.01)
*H04W 84/12* (2009.01)
*H04W 92/20* (2009.01)

(52) U.S. Cl.
CPC ........... *H04W 24/02* (2013.01); *H04W 24/04* (2013.01); *H04W 52/0206* (2013.01); *H04W 72/0446* (2013.01); *H04W 84/12* (2013.01); *H04W 92/20* (2013.01)

(56) References Cited

U.S. PATENT DOCUMENTS

| | | | |
|---|---|---|---|
| 2010/0020710 A1* | 1/2010 | Gupta | H04J 11/0093 370/252 |
| 2011/0269465 A1* | 11/2011 | Xu | H04W 36/0033 455/436 |
| 2012/0044925 A1 | 2/2012 | Lee et al. | |
| 2014/0179352 A1* | 6/2014 | V.M. | G01S 5/0252 455/456.2 |
| 2015/0078402 A1* | 3/2015 | Diener | H04L 61/609 370/475 |
| 2015/0201360 A1* | 7/2015 | Ray Chaudhuri | H04W 36/30 455/436 |
| 2015/0358895 A1* | 12/2015 | Cho | H04W 24/02 370/329 |
| 2016/0323853 A1* | 11/2016 | Kim | H04W 72/12 |
| 2017/0164406 A1* | 6/2017 | Son | H04W 74/08 |
| 2018/0132278 A1* | 5/2018 | Oteri | H04W 74/02 |
| 2018/0242373 A1* | 8/2018 | Wang | H04W 74/004 |

FOREIGN PATENT DOCUMENTS

| | | |
|---|---|---|
| JP | 11-243406 A | 9/1999 |
| JP | 2004-193746 A | 7/2004 |
| JP | 2013-513284 A | 4/2013 |
| JP | 2015-015554 A | 1/2015 |
| JP | 5774169 B2 | 9/2015 |
| KR | 10-2012-0093319 A | 8/2012 |
| WO | 2011/068387 A2 | 6/2011 |
| WO | 2015/001724 A1 | 1/2015 |

OTHER PUBLICATIONS

Fischer, et al., "CID 205 BSSID Color Bits", IEEE mentor, 802.11-13/1207r0, Sep. 16, 2013, 20 pages.

International Search Report and Written Opinion of PCT Application No. PCT/JP2016/077557, dated Nov. 15, 2016, 09 pages of ISRWO.

* cited by examiner

FIG. 6

| Frame Control | Duration | Address1 | Address2 | PID Notify Request Control | | FCS |
|---|---|---|---|---|---|---|
| | | | | Number of Slots | Used Slots | |

FIG. 8

| Frame Control | Duration | PID | FCS |

COMMUNICATION DEVICE AND COMMUNICATION METHOD

CROSS REFERENCE TO RELATED APPLICATIONS

This application is a U.S. National Phase of International Patent Application No. PCT/JP2016/077557 filed on Sep. 16, 2016, which claims priority benefit of Japanese Patent Application No. JP 2015-249972 filed in the Japan Patent Office on Dec. 22, 2015. Each of the above-referenced applications is hereby incorporated herein by reference in its entirety.

TECHNICAL FIELD

The present disclosure relates to communication devices and communication methods.

BACKGROUND ART

In recent years, wireless local area networks (LANs) representative of Institute of Electrical and Electronics Engineers (IEEE) 802.11 have been widely used. Further, along with this, wireless LAN compatible products have also increased. Here, many wireless LAN compatible products are mobile communication terminals. Since the mobile communication terminals have limited opportunities to receive power supply from the outside, it is preferable that power consumption be suppressed.

For example, Patent Literature 1 discloses a method of reducing power consumption of a communication device that operates as a station (STA) (hereinafter, also simply referred to as a STA) by storing information by which a wireless communication network that serves as a communication destination is identified (hereinafter, also referred to as a wireless network identifier) in a physical layer convergence protocol (PLCP) header. Specifically, a partial identifier that is formed of a basic service set identifier (BSSID) and the like is stored in the PLCP header. The STA that receives the PLCP header causes the STA itself to sleep without receiving the following part of the PLCP header in a case in which the partial identifier indicates a partial identifier other than a partial identifier of a BSSID related to a BSS to which the STA itself (the corresponding STA) belongs (hereinafter, also referred to as its own BSS). In this manner, it is assumed that the power consumption in the STA will be reduced.

CITATION LIST

Patent Literature

Patent Literature 1: JP 5774169B

DISCLOSURE OF INVENTION

Technical Problem

However, according to the disclosure of Patent Literature 1, the effect of reducing the power consumption may be reduced in a case in which wireless communication network identifiers overlap between a plurality of wireless communication networks. In a case in which the aforementioned BSSIDs or the aforementioned partial identifiers overlap between a plurality of BSSs, for example, there is a possibility that a STA, which belongs to a BSS that is different from a BSS to which a STA intended to receive the following part of a PLCP header belongs, may receive the following part of the PLCP header without sleeping. Therefore, it is desirable to avoid overlapping of information for identifying the wireless communication network. Meanwhile, it is not preferable that communication frequently occur for avoiding the overlapping and a wireless communication resource be overloaded.

Thus, the present disclosure will propose a mechanism capable of avoiding overlapping of wireless communication network identifiers while curbing degradation of utilization efficiency of the wireless communication resource.

Solution to Problem

According to the present disclosure, there is provided a communication device including: a communication unit that transmits a request signal for a wireless communication network identifier identified in a physical layer and receives a response signal by a wireless communication resource corresponding to the wireless communication network identifier after the transmission of the request signal.

In addition, according to the present disclosure, there is provided a communication device including: a communication unit that receives a request signal for a wireless communication network identifier identified in a physical layer and transmits a response signal by a wireless communication resource corresponding to the wireless communication network identifier after the reception of the request signal.

According to the present disclosure, there is provided a communication method including, by using a processor: transmitting a request signal for a wireless communication network identifier identified in a physical layer; and receiving a response signal by a wireless communication resource corresponding to the wireless communication network identifier after the transmission of the request signal.

In addition, according to the present disclosure, there is provided a communication method including, by using a processor: receiving a request signal for a wireless communication network identifier identified in a physical layer; and transmitting a response signal by a wireless communication resource corresponding to the wireless communication network identifier after the reception of the request signal.

Advantageous Effects of Invention

According to the present disclosure, a mechanism capable of avoiding overlapping of wireless communication network identifiers while curbing degradation of utilization efficiency of the wireless communication resource is provided as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram illustrating an example of a frame configuration of a PRQ according to the embodiment.

FIG. 8 is a diagram illustrating an example of a frame configuration of the PRS according to the embodiment.

MODE(S) FOR CARRYING OUT THE INVENTION

Figure 1:
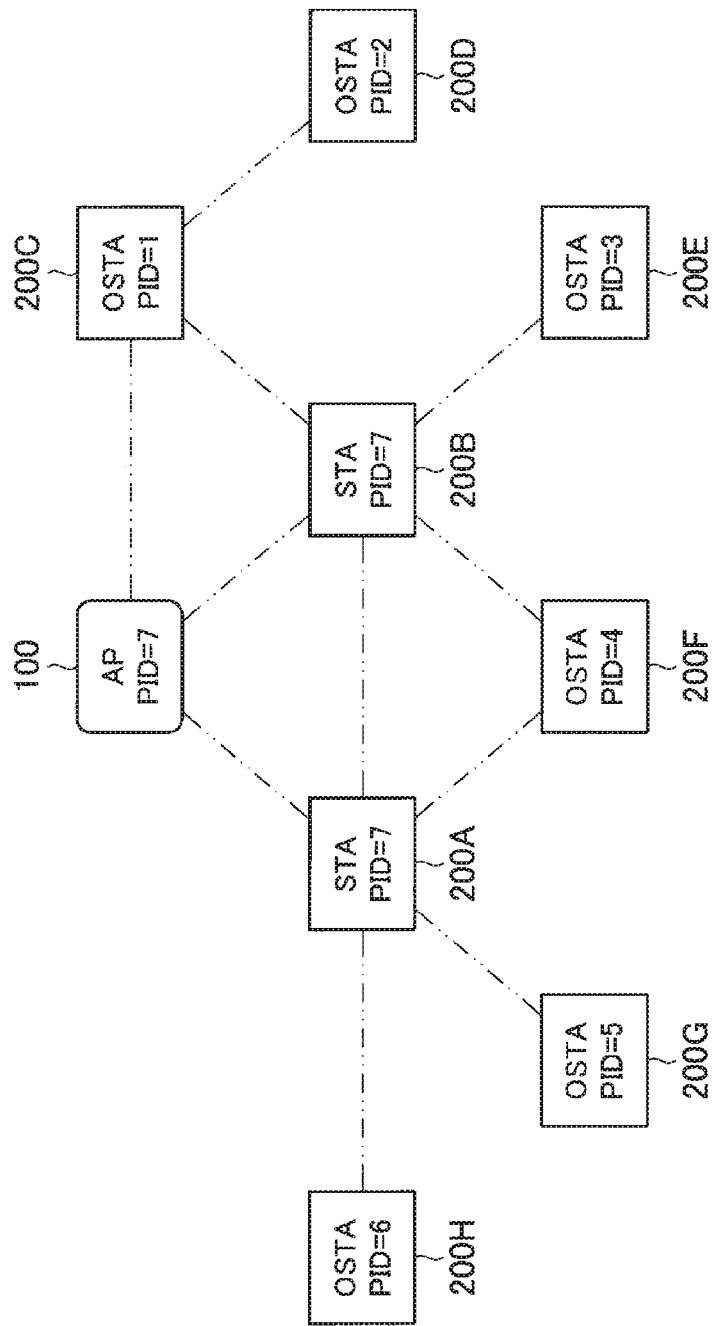
FIG. 1 is a diagram for explaining an outline of a communication device according to each embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of structural elements having substantially the same function are distinguished by adding different numbers to the end of the same reference numeral. For example, a plurality of structural elements having substantially the same function are distinguished as necessary like a STA 200A and a STA 200B. However, in a case where it is unnecessary to distinguish structural elements having substantially the same function, only the same reference numeral is added. For example, in a case where it is unnecessary to particularly distinguish the STA 200A and the STA 200B, they are simply referred to as "STAs 200."

Note that description will be given in the following order.
1. Outline
2. First embodiment (notification of PIDs that are being used to request device)
2-1. Basic configuration of device
2-2. Detailed configuration of device
2-3. Processing of device
2-4. Operation example
2-5. Summary of first embodiment
2-6. Modification example
3. Second embodiment (notification of PIDs that are being used to request device for each type)
3-1. Detailed configuration of device
3-2. Processing of device
3-3. Operation example
3-4. Summary of first embodiment
4. Application example
5. Conclusion

1. Outline

Figure 2:
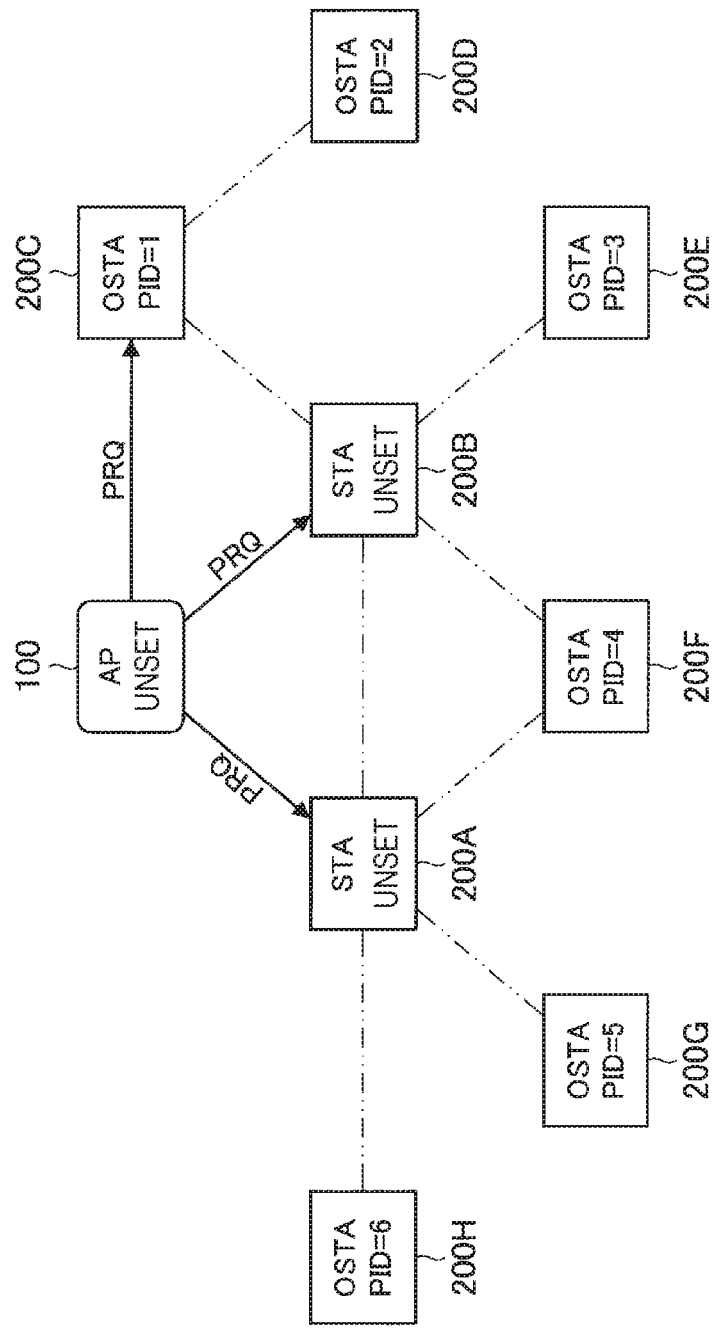
FIG. 2 is a diagram for explaining an outline of a communication device according to each embodiment of the present disclosure.
Figure 3:
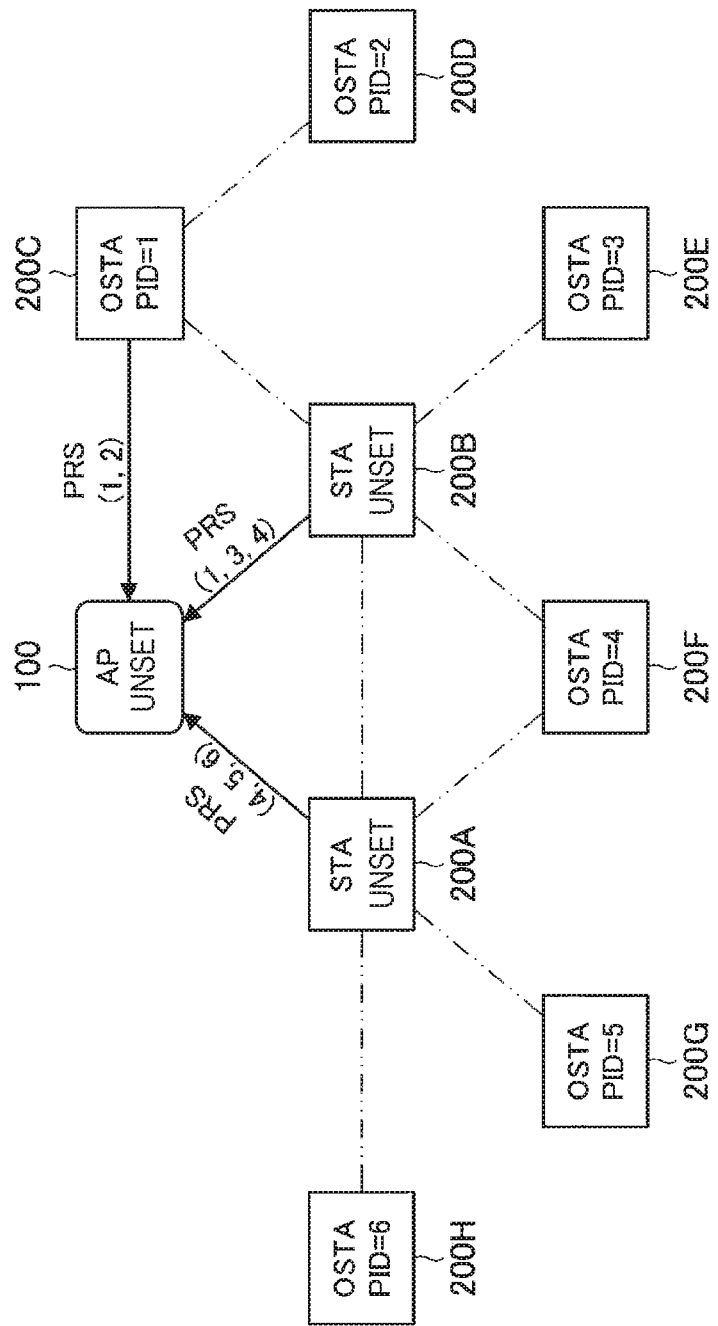
FIG. 3 is a diagram for explaining an outline of a communication device according to each embodiment of the present disclosure.

First, an outline of a communication device according to each embodiment of the present disclosure will be described with reference to FIGS. 1 to 3. FIGS. 1 to 3 are diagrams for explaining the outline of the communication device according to each embodiment of the present disclosure.

The communication system includes an AP 100 and an STA 200 that serve as communication devices, and a wireless communication network to which the AP 100 and the STA 200 belong is formed. Specifically, the AP 100 decides a wireless communication network identifier to which the AP 100 itself belongs and provides a notification of the decided wireless communication network identifier to the STA 200 connected thereto for communication. Then, communication using the wireless communication network identifier provided in the notification is performed between the communication devices in the wireless communication network. In addition, the wireless communication network identifier is information on the basis of which the wireless communication network, for example, a BSS is identified in the physical layer. Specifically, the wireless communication network identifier is included in a PLCP header (physical layer (PHY) header). Therefore, the communication device that receives the PLCP header can determine whether or not the communication device itself is a target for reception of a frame including the PLCP header in a stage of processing of receiving the PLCP header. Therefore, it is possible to reduce power consumption in the communication devices since only the communication device as a target for reception of the frame receives the following part of the PLCP header. Note that the wireless communication network identifier will also be referred to as a physical layer identifier: PHY ID (PID) in the following description.

For example, a case in which an AP 100 and STAs 200A and 200B that belong to the same BSS are present and STAs 200C to 200H (hereinafter, also referred to as overlapping STAs (OSTAs)) that belong to a BSS with a communication range that overlaps that of another BSS (hereinafter, also referred to as an overlapping BSS (OBSS)) are present as illustrated in FIG. 1 will be considered.

A BSS (hereinafter, also referred to as a BSS 7), to which the AP 100 and the STAs 200A and 200B belong, which has a PID of 7 (hereinafter, also referred to as a PID (7)) and BSS 1 and BSSs 3 to 6 to which the OSTAs 200C and 200E to 200H respectively belong have overlapping communication ranges. For example, the AP 100 and the OSTA 200C can communicate with each other.

Meanwhile, communication targeting communication devices that belong to a specific BSS utilizing a PID is performed. For example, a PLCP header that has the PID (7) is transmitted from the AP 100. The STAs 200A and 200B receive the following part of the PLCP header since the PID of their own BSS is 7. However, the OSTA 200C does not receive the following part of the PLCP header since the PID of the BSS to which the OSTA 200C itself belongs is 1.

Therefore, the processing of receiving a frame that is not a target for reception is omitted in the OSTA 200C, and power consumption is reduced.

However, in a case in which the PID overlaps between the plurality of BSSs, the processing of receiving the following part of the PLCP header is also performed in the communication devices other than the communication device which is a target for reception. In a case in which the PID of the BSS to which the OSTA 200C belongs is 7, for example, the processing of receiving the following part of the PCLP header is executed in the OSTA 200C when the PLCP header that has the PID (7) is transmitted from the AP 100 in a manner similar to that described above. As a result, an inadvertent operation, such as discard of information of the following part of the PLCP header obtained by the aforementioned reception processing, or setting of a network allocation vector (NAV) on the basis of the information, occurs in the OSTA 200C that is not a proper reception target. In particular, transmission opportunities of the OSTA 200C decrease due to inappropriate setting of the NAV. Therefore, it is desirable that overlapping of the PIDs be avoided.

In order to avoid such overlapping of the PIDs, it is necessary to recognize a PID that has already been used by another BSS. Therefore, collecting information by which it is possible to recognize a PID that has been used by another BSS may be conceived. In one example, collection of the PID utilizing frame exchange, such as exchange of a probe request and a probe response, may be considered. However, it is necessary to exchange frames between the AP and each STA as a PID collection target in this case. Therefore, a wireless communication resource such as a time and transmission paths required for collecting the PID increase as the number of STAs increases. In this manner, it is not preferable that the wireless communication resource be wasted when collecting the information.

In addition, as another example of a method for recognizing the PIDs that are being used, receiving frames that are being communicated and acquiring the PIDs from a PLCP header or the like of the frame may be conceived. However, it is not certain whether or not the PIDs will be collected in this case. Therefore, the reliability of avoidance of overlapping of the PIDs is lower as compared with a case of frame exchange.

Thus, according to each embodiment of the present disclosure, a communication device (hereinafter, also referred to as a request device) that transmits a request signal for a wireless communication network identifier identified in a physical layer and receives a response signal using a wireless communication resource corresponding to the wireless communication network identifier after the transmission of the request signal is provided. In addition, a communication device 200 (hereinafter, also referred to as a response device) that receives the request signal and transmits a response signal using a wireless communication resource corresponding to the wireless communication network identifier after the reception of the request signal is also provided. Further, operation examples of the request device and the response device will be described with reference to FIGS. 2 and 3.

For example, a case in which the AP 100 operates as a request device and the STAs 200A and 200B and the OSTA 200C operate as response devices will be considered.

The AP 100 transmits a PID notify request (PRQ) to peripheral communication devices in a case in which the PID has not yet set. As illustrated in FIG. 2, for example, the AP 100 transmits the PRQ to the STAs 200A and 200B and the OSTA 200C.

In contrast, the STAs 200A and 200B and the OSTA 200C transmit a PID notify response (PRS) to the AP 100. As illustrated in FIG. 3, for example, the STAs 200A and 200B and the OSTA 200C transmit PRSs for providing notifications of PIDs of their own BSS and a BSS that is adjacent to their own BSS to the AP 100, respectively. At this time, the PRSs are transmitted at a timing corresponding to the PID as targets of the notification, for example. Therefore, the PRSs are respectively transmitted from each of the STAs 200A and 200B at a timing corresponding to a PID (4), for example.

As describes above, the request device transmits the PRQ and receives the PRSs by a wireless communication resource corresponding to the PID after the transmission of the PRQ. In addition, the response devices receive the PRQ and transmit the PRSs using the wireless communication resource corresponding to the PID after the reception of the PRQ. Therefore, it is possible to reduce the amount of wireless communication resource used as compared with a case in which the PID itself is communicated, by specifying the PIDs that are being used in the wireless communication resource by which the PRS is received. Therefore, it is possible to avoid overlapping of the wireless communication network identifiers while curbing degradation of utilization efficiency of the wireless communication resource. Hereinafter, the AP 100 that operates as the request device and the STA (OSTA) 200 that operates as the response device will be respectively described in detail. Note that, for convenience of description, the AP 100 according to first and second embodiments will be distinguished by adding numbers corresponding to the embodiments to the end, like AP 100-1 and AP 100-2. Note that this similarly applies to the STA (OSTA) 200.

2. First Embodiment (Notification of PID that is being Used to Request Device)

The outline of the communication device according to each embodiment of the present disclosure has been described above. Next, a first embodiment of the present disclosure will be described.

2-1. Basic Configuration of Device

Figure 4:
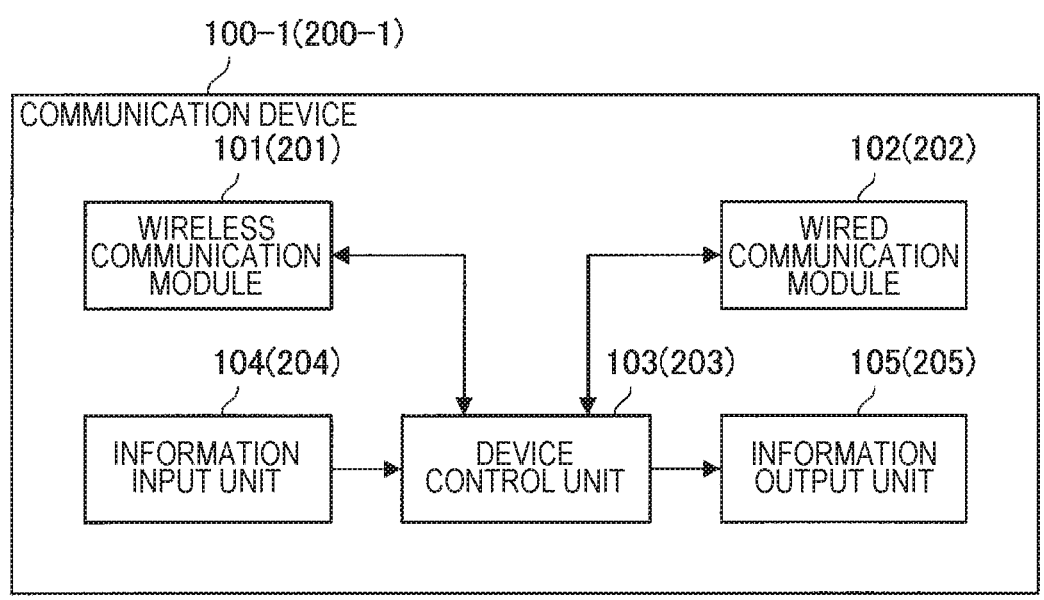
FIG. 4 is a block diagram illustrating an example of a schematic functional configuration of a communication device according to a first embodiment of the present disclosure.

First, basic functional configurations of an AP 100-1 that operates as a request device and an STA 200-1 that operates as a response device (hereinafter, also referred to as a communication device 100-1 (200-1) will be described with reference to FIG. 4. FIG. 4 is a block diagram illustrating an example of a schematic functional configuration of the communication device 100-1 (200-1) according to the first embodiment of the present disclosure.

As illustrated in FIG. 4, a communication device 100-1 (200-1) includes a wireless communication module 101 (201), a wired communication module 102 (202), a device control unit 103 (203), an information input unit 104 (204), and an information output unit 105 (205).

The wireless communication module 101 (201) performs wireless communication with other communication devices. Specifically, the wireless communication module 101 (201) transmits data obtained from the device control unit 103 (203) and provides received data to the device control unit 103 (203). The details will be described later.

The wired communication module 102 (202) communicates with an external device via wired communication. Specifically, the wired communication module 102 (202) is connected to the Internet and communicates with the external device via the Internet. For example, the wired communication module 102 (202) transmits data acquired via communication by the wireless communication module 101 (201) to the external device via the Internet.

The device control unit 103 (203) controls operation of the communication device 100-1 (200-1) in general. Specifically, the device control unit 103 (203) controls communication of the wireless communication module 101 (201) and the wired communication module 102 (202). For example, the device control unit 103 (203) causes the wireless communication module 101 (201) or the wired communication module 102 (202) to transmit data obtained from the information input unit 104 (204). Further, the device control unit 103 (203) causes the information output unit 105 (205) to output data obtained by the communication of the wireless communication module 101 (201) or the wired communication module 102 (202).

The information input unit 104 (204) receives an input from the outside of the communication device 100-1 (200-1). Specifically, the information input unit 104 (204) receives a user input or information obtained from a sensor. For example, the information input unit 104 (204) is an input device such as a keyboard or a touch panel or a detection device such as a sensor.

The information output unit 105 (205) outputs data. Specifically, the information output unit 105 (205) outputs data instructed from the device control unit 103 (203). For example, the information output unit 105 (205) is a display that outputs images on the basis of image information, a speaker that outputs sounds or music on the basis of audio information, or the like.

Further, the wired communication module 102 (202), the information input unit 104 (204) and the information output unit 105 (205) among the above components may not be included in the communication device 100-1 (200-1).

(Configuration of Wireless Communication Module)

Figure 5:
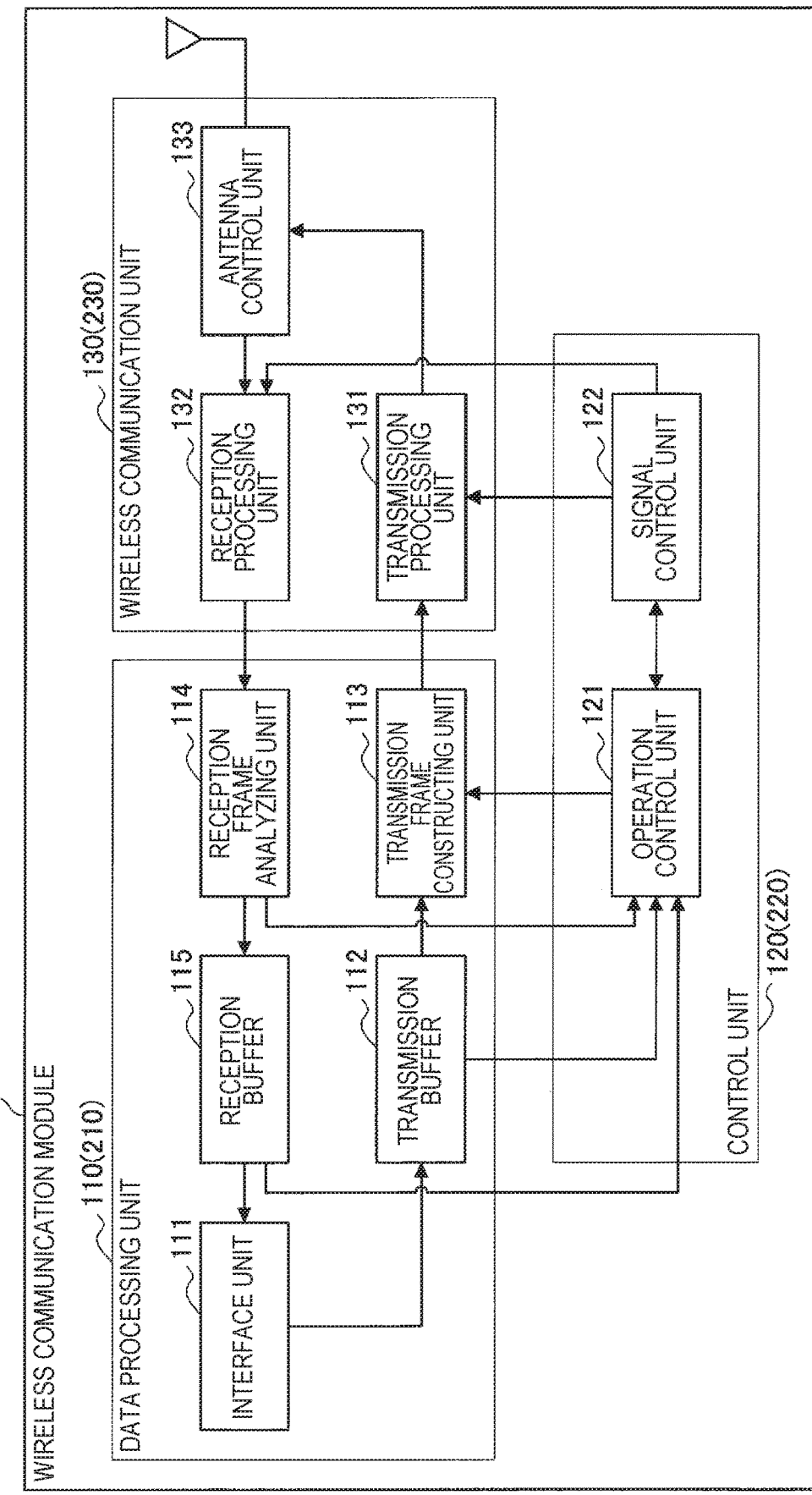
FIG. 5 is a block diagram illustrating an example of a schematic functional configuration of a wireless communication module according to the embodiment.

Next, a functional configuration of the wireless communication module 101 (201) will be described with reference to FIG. 5. FIG. 5 is a block diagram illustrating an example of a schematic functional configuration of the wireless communication module 101 (201) according to the first embodiment of the present disclosure.

As illustrated in FIG. 5, the wireless communication module 101 (201) includes a data processing unit 110 (210), a control unit 120 (220), and a wireless communication unit 130 (230) as a communication unit.

(1. Data Processing Unit)

As illustrated in FIG. 5, the data processing unit 110 (210) includes an interface unit 111, a transmission buffer 112, a transmission frame constructing unit 113, a reception frame analyzing unit 114, and a reception buffer 115.

The interface unit 111 is an interface connected to other functional components installed in the communication device 100-1 (200-1). Specifically, the interface unit 111 performs reception of data that is desired to be transmitted from another functional component, for example, the device control unit 103 (203), provision of reception data to the device control unit 103 (203), or the like.

The transmission buffer 112 stores data to be transmitted. Specifically, the transmission buffer 112 stores data obtained by the interface unit 111.

The transmission frame constructing unit 113 generates a frame to be transmitted. Specifically, the transmission frame constructing unit 113 generates a frame on the basis of data stored in the transmission buffer 112 or control information set by the control unit 120 (220). For example, the transmission frame constructing unit 113 generates a frame (packet) from data acquired from the transmission buffer 112, and performs a process of adding a MAC header for medium access control (MAC) and an error detection code to the generated frame and the like.

The reception frame analyzing unit 114 analyzes a received frame. Specifically, the reception frame analyzing unit 114 determines a destination of a frame received by the wireless communication unit 130 (230) and acquires data or control information included in the frame. For example, the reception frame analyzing unit 114 acquires data and the like included in the received frame by performing analysis of the MAC header, detection and correction of a code error, a reordering process, and the like on the received frame.

The reception buffer 115 stores received data. Specifically, the reception buffer 115 stores data acquired by the reception frame analyzing unit 114.

(2. Control Unit)

As illustrated in FIG. 5, the control unit 120 (220) includes an operation control unit 121 and a signal control unit 122.

The operation control unit 121 controls an operation of the data processing unit 110 (210). Specifically, the operation control unit 121 controls the occurrence of communication. For example, if a communication connection request occurs, the operation control unit 121 causes the data processing unit 110 (210) to generate frames related to a connection process or an authentication processing such as an association process or an authentication process.

Further, the operation control unit 121 controls generation of frames on the basis of a storage state of data in the transmission buffer 112, an analysis result for a reception frame, or the like. For example, in a case in which data is stored in the transmission buffer 112, the operation control unit 121 instructs the transmission frame constructing unit 113 to generate a data frame in which the data is stored. Further, in a case in which reception of a frame is confirmed by the reception frame analyzing unit 114, the operation control unit 121 instructs the transmission frame constructing unit 113 to generate an acknowledgment frame which is a response to a received frame.

The signal control unit 122 controls an operation of the wireless communication unit 130 (230). Specifically, the signal control unit 122 controls a transmission/reception process of the wireless communication unit 130 (230). For example, the signal control unit 122 causes the wireless communication unit 130 (230) to set a parameter for transmission and reception on the basis of an instruction from the operation control unit 121.

Note that the information related to the wireless communication network such as a PID is managed by the control unit 120 (220). For example, the control unit 120 (220) manages the BSS information such as COLOR information of its own BSS and another BSS that is different from its own BSS.

(3. Wireless Communication Unit)

As illustrated in FIG. 5, the wireless communication unit 130 (230) includes a transmission processing unit 131, a reception processing unit 132, and an antenna control unit 133.

The transmission processing unit 131 performs a frame transmission process. Specifically, the transmission processing unit 131 generates a signal to be transmitted on the basis of a frame provided from the transmission frame constructing unit 113. More specifically, the transmission processing unit 131 generates a signal related to a frame on the basis of a parameter set in accordance with an instruction from the signal control unit 122. For example, the transmission processing unit 131 generates a symbol stream by performing encoding, interleaving, and modulation on the frame provided from the data processing unit 110 (210) in accordance with a coding and modulation scheme instructed by the control unit 120 (220). Further, the transmission processing unit 131 converts the signal related to the symbol stream obtained by the process at the previous stage into an analog signal, and performs amplification, filtering, and frequency up-conversion on the resulting signal.

Further, the transmission processing unit 131 may perform a frame multiplexing process. Specifically, the transmission processing unit 131 performs a process related to time division multiplexing, code division multiplexing, frequency division multiplexing or space division multiplexing.

The reception processing unit 132 performs a frame reception process. Specifically, the reception processing unit 132 restores the frame on the basis of the signal provided from the antenna control unit 133. For example, the reception processing unit 132 acquires a symbol stream by performing a process opposite to the signal transmission, for example, frequency down-conversion, digital signal conversion, and the like on a signal obtained from an antenna. Further, the reception processing unit 132 acquires a frame by performing demodulation, decoding, and the like on the symbol stream obtained by the process at the previous stage and provides the acquired frame to the data processing unit 110 (210) or the control unit 120 (220).

Further, the reception processing unit 132 may perform a process related to separation of a multiplexed frame. Specifically, the reception processing unit 132 performs a process related to separation of a frame multiplexed by the time division multiplexing, the code division multiplexing, the frequency division multiplexing or the space division multiplexing.

Further, the reception processing unit 132 may estimate a channel gain. Specifically, the reception processing unit 132 calculates complex channel gain information from a preamble portion or a training signal portion of the signal obtained from the antenna control unit 133. Further, the calculated complex channel gain information is used for a frame multiplexing-related process, a frame separation process, and the like.

The antenna control unit 133 performs transmission and reception of signals via at least one antenna. Specifically, the antenna control unit 133 transmits the signal generated by the transmission processing unit 131 via the antenna and provides the signal received via the antenna to the reception processing unit 132. Further, the antenna control unit 133 may perform control related to space division multiplexing.

Further, the transmission/reception process of the PLCP header including the PID or the like is performed by the wireless communication unit 130 (230). The process will be described in detail later.

2-2. Detailed Configuration of Device

Next, details of functions of the communication device 100-1 (200-1) according to the embodiment will be described. In the following description, functions of the AP 100-1 that operates as a request device that requests a notification of a PID and the STA 200-1 or OSTA 200-1 (hereinafter, also simply referred to as the STA 200-1) that operates as a response device that responds with a notification of the PID will be separately described.

(A. Functions of Request Device)

First, functions of the AP 100-1 that operates as a request device will be described.

(A-1. Transmission of PRQ)

The AP 100-1 transmits a PRQ as a PID request signal. Specifically, the control unit 120 causes the data processing unit 110 to generate the PRQ if a PID setting request occurs. Then, the wireless communication unit 130 transmits the generated PRQ. For example, the PID is COLOR information of a BSS. In a case in which formation of the BSS to which the AP 100-1 belongs is requested, and COLOR information is decided, the control unit 120 provides an instruction for generating the PRQ to the data processing unit 110.

In addition, the PRQ has correspondence relation information with which correspondence relation between the PIDs and the wireless communication resource that is used for transmitting the PRS is specified. Specifically, the correspondence relation information is the number of sections in accordance with the PIDs of the wireless communication resource. For example, the PRQ includes information for controlling the transmission of the PRS including the correspondence relation information (hereinafter, also referred to as PRS transmission parameters). As the correspondence relation information, the number of time slots in which the PRS is transmitted may be exemplified. Then, in a case in which an order of PIDs on the time slots have been ascertained, the respective time slots and the respective PIDs correspond to each other. Therefore, the number of time slots basically corresponds to the number of PIDs that can be set. Note that since the wireless communication resource that can be utilized in the communication of the PRS may change, all the set time slots may not be utilized. For example, the control unit 120 may cause the PRS to store information indicating the number of time slots in accordance with a period, during which the control unit 120 itself can perform reception, in the number of time slots.

Further, the PRQ will be described in detail with reference to FIG. 6. FIG. 6 is a diagram illustrating an example of a frame configuration of a PRQ according to the embodiment. The frame configuration of the PRQ has fields such as Frame Control, Duration, Address 1, Address 2, PID Notify Request Control, and Frame Check Sequence (FCS) as illustrated in FIG. 6. The Frame Control field stores information indicating that the frame is a PRQ, and the Duration field stores information with which a PRS transmission period corresponding to the PRQ is specified. The Address 1 field stores its own MAC address, and the Address 2 field stores a broadcast address. Further, the PID Notify Request Control field has fields such as a Number of Slots and Used Slots in which the PRS transmission parameters are stored. The Number of Slots field stores information indicating the number of time slots, and the Used Slots field stores information indicating the number of time slots in accordance with a period during which the AP 100-1 itself can perform reception.

Note that although the example in which the correspondence relation information is the number of sections in accordance with the PIDs has been described above, the correspondence relation information may be an interval between the sections. For example, the correspondence relation information may be a width between the respective time slots. In this case, the number of time slots is set according to the width of the time slots when a PRS transmission period is known.

In addition, although the example in which the PRQ is a control frame has been described above, the PRQ may be another type of frame. For example, the PRQ may be a management frame, a data frame, or the like. In addition, although the example in which the PRQ is a frame has been described above, the PRQ may be a signal other than the frame. In a case in which the aforementioned PRS transmission parameters are known to the response device, namely, the STA 200-1, for example, a training signal or another signal of a predetermined pattern may be transmitted as the PRQ.

(A-2. Reception of PRS)

Figure 7:
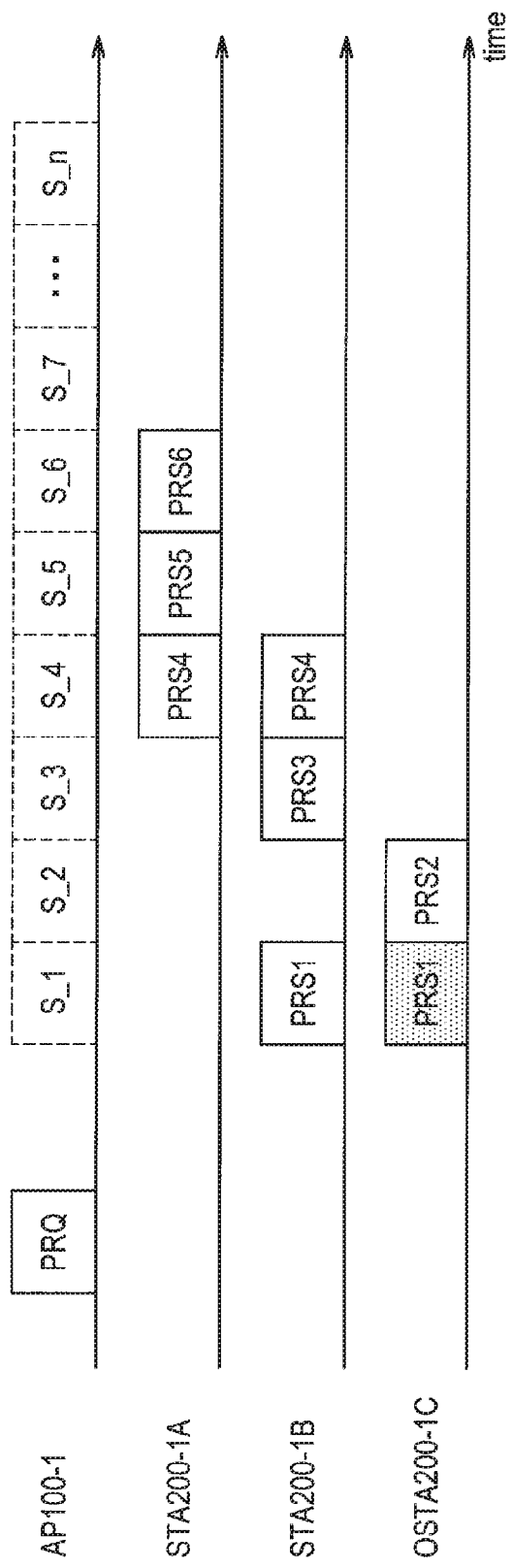
FIG. 7 is a diagram illustrating an example of communication of a PRQ and a PRS according to the embodiment.

The AP 100-1 receives a PRS as a response signal by the wireless communication resource corresponding to the PID after the transmission of the PRQ. Specifically, the AP 100-1 receives the PRS by the wireless communication resource corresponding to the PID that is used in the BSS to which the PRS transmission source of belongs. In addition, the AP 100-1 receives the PRS by the wireless communication resource corresponding to the PID that is used in the BSS that is adjacent to the BSS to which the PRS transmission source belongs. Note that the wireless communication resource includes a time. Further, details of the reception of the PRS will be described with reference to FIG. 7. FIG. 7 is a diagram illustrating an example of communication of the PRQ and the PRS according to the embodiment.

First, the AP 100-1 waits for the PRS after the transmission of the PRQ. For example, the wireless communication unit 130 stands by for a period equivalent to the number of time slots set after elapse of a predetermined time such as a short inter-frame space SIFS since the transmission of the PRQ, that is, until the PRS transmission period arrives.

Next, the AP 100-1 receives the PRS by the wireless communication resource corresponding to the PID. For example, the time slots are set to S_1 to S_n as illustrated in FIG. 7, and the PRS is received in units of the time slots.

If the PRS is received, the AP 100-1 specifies the PID corresponding to the wireless communication resource that is used for the communication of the PRS and stores the specified PID. If the PRS transmission period arrives, and a PRS 1 is received by the wireless communication unit 130 in the time slot S_1, for example, the control unit 120 specifies a PID (1) corresponding to the time slot equivalent to the reception time. Then, the control unit 120 stores the specified PID (1).

Here, the PID in accordance with the wireless communication resource that is used for the communication of the PRS is a PID of the BSS of the PRS transmission source or a PID of the BSS that is adjacent to the BSS as the transmission source. In other words, the PRS based on the PID of the BSS to which the PRS transmission source belongs (hereinafter, also referred to as a direct PRS) or the PRS based on the PID of the BSS that is adjacent to the BSS to which the PRS transmission source belongs (hereinafter, also referred to as an indirect PRS) is received. For example, the PRS 1 received from the OSTA 200-1C represented by the dot pattern in FIG. 7 is transmitted as a direct PRS based on the PID of the BSS to which the OSTA 200-1C belongs. Meanwhile, the PRS 1 received from the STA 200-1B is transmitted as an indirect PRS based on the PID of the BSS that is adjacent to the BSS to which the STA 200-1B belongs.

In addition, the PRS is multiplexed in terms of a time. In the STA 200-1A, a plurality of PRS 4 to PRS 6 are temporally orthogonal and are transmitted to the AP 100-1 in a time division multiplexed manner by the PRS 4 to PRS 6 being transmitted in the corresponding time slots S_4 to S_6, respectively, as illustrated in FIG. 7, for example.

Note that the example in which a direct PRS and an indirect PRS are present together has been described in FIG. 7, only a direct PRS or only an indirect PRS may be received.

In addition, the AP 100-1 receives a PRS with a received signal intensity of equal to or greater than a threshold value. Specifically, the wireless communication unit 130 receives only a PRS with a received signal intensity of equal to or greater than a preset threshold value. Note that the threshold value may be changed later.

Figure 8:
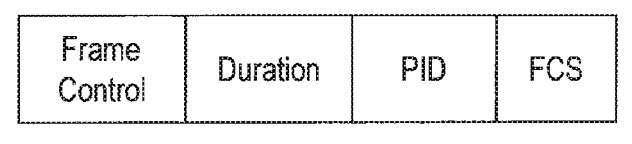

In addition, the PRS may have information indicating the PID. Specifically, the PRS may include information indicating the PID corresponding to the wireless communication resource by which the PRS is transmitted. Further, the PRS will be described in detail with reference to FIG. 8. FIG. 8 is a diagram illustrating an example of a frame configuration of the PRS according to the embodiment.

The frame configuration of the PRS has fields such as Frame Control, Duration, PID, and FCS as illustrated in FIG. 8. Note that the PID field stores information indicating the PID corresponding to the time slot in which the PRS is transmitted. Therefore, the details of PRSs received in the same time slot are the same regardless of which of the STAs 200-1 the PRS is transmitted from and regardless of which of a direct PRS and an indirect PRS the PRS is. Therefore, even in a case in which a plurality of PRSs are transmitted, it is only necessary for at least one of the plurality of PRSs to be received.

Note that although the example in which the PRS is a control frame has been described above, the PRS may be another type of frame in a manner similar to that of the PRQ. In addition, although the example in which the PRS is a frame has been described above, the PRS may be a signal other than a frame in a manner similar to that of the PRQ. In this case, even when a plurality of PRSs are transmitted in the same time slot, and it becomes difficult to decode the signals due to conflict of the signals, the request device can recognize the PIDs that are being used on the basis of the fact that the signals have been received in the time slot. Note that the received signal intensity of the signals may be required to be equal to or greater than a threshold value as described above.

(A-3. Decision of PID)

The AP 100-1 decides a PID on the basis of reception of a PRS. Specifically, the control unit 120 decides a PID other than PIDs corresponding to time slots in which the PRS is received as a PID of the wireless communication network to which the AP 100-1 belongs. More specifically, since the PID corresponding to the time slot in which the PRS is received is stored, the control unit 120 decides a PID that is different from the stored PID from among all the PIDs that can be set as a PID that is used, as its own BSS and serves as a first PID (hereinafter, also referred to as its own PID). Since PRS 1 to PRS 6 have been received as illustrated in FIG. 7, for example, the control unit 120 decides a PID other than the PIDs (1) to (6) corresponding to the PRS 1 to PRS 6, for example, the PID (7) as its own PID.

(B. Functions of Response Device)

Subsequently, functions of the STA 200-1 (OSTA 200-1) that operates as a response device will be described.

(B-1. Collection of PID)

The STA 200-1 collects a PID of a BSS around the STA 200-1 itself. Specifically, the wireless communication unit 230 receives a signal that has the PID from another communication device and acquires the PID from the received signal. Then, the control unit 220 stores the acquired PID as a PID that serves as a second PID and is used in a BSS that is adjacent to its own BSS (hereinafter, also referred to as an adjacent PID).

In addition, the STA 200-1 may collect the PID on the basis of the PRS transmitted from another STA 200-1. Specifically, if the PRS is received from another STA 200-1 during the PRS transmission period, the control unit 220 stores the PID corresponding to the wireless communication resource that is used for receiving the PRS as an adjacent PID. For example, the control unit 220 stores the PID corresponding to the time slot in which the PRS is received as an adjacent PID.

(B-2. Reception of PRQ)

The STA 200-1 receives the PRQ as the request signal. Specifically, the wireless communication unit 230 waits for the reception of the PRQ transmitted from the AP 100-1. Then, if the wireless communication unit 230 receives the PRQ, the data processing unit 210 acquires a PRS transmission parameter from the received PRQ and provides the acquired PRS transmission parameter to the control unit 220.

(B-3. Transmission of PRS)

The STA 200-1 transmits the PRS as the response signal by the wireless communication resource corresponding to the PID after the reception of the PRQ. Specifically, the STA 200-1 transmits the PRS by the wireless communication resource corresponding to the PID that is used in the BSS to which the STA 200-1 itself belongs. In addition, the STA 200-1 transmits the PRS by the wireless communication resource corresponding to the stored adjacent PID. Further, the transmission of the PRS will be described in detail with reference to FIG. 7.

For example, operations of the OSTA 200-1C in FIG. 7 will be described. If the PRQ is received, the OSTA 200-1C prepares for the transmission of the PRS on the basis of the PRS transmission parameter obtained from the PRQ. Specifically, the control unit 220 sets the PRS transmission period and the time slot on the basis of the PRS transmission parameter. For example, the control unit 220 sections the PRS transmission period in accordance with the number of time slots and causes the data processing unit 210 and the wireless communication unit 230 to wait such that the PRS can be transmitted in each unit of the time slots S_1 to S_n.

In a case in which a time slot corresponding to its own PID arrives, the OSTA 200-1C transmits the PRS in the time slot. For example, the control unit 220 determines whether or not the arriving time slot is a time slot corresponding to its own PID (1) every time each time slot arrives. Then, in a case in which it is determined that the time slot S_1 corresponding to its own PID (1) has been arrived, the control unit 220 causes the data processing unit 210 to generate the PRS 1 that has information indicating its own PID (1), and the generated PRS 1 is transmitted within the time slot S_1 by the wireless communication unit 130 as illustrated in FIG. 7.

In addition, in a case in which the time slot corresponding to the stored adjacent PID arrives, the OSTA 200-1C transmits the PRS in the time slot. For example, the control unit 220 determines whether or not the arriving time slot is the time slot corresponding to the stored adjacent PID (2) every time each time slot arrives. Then, in a case in which it is determined that the time slot S_2 corresponding to the adjacent PID (2) has arrived, the control unit 220 causes the data processing unit 210 to generate a PRS 2 that has information indicating the adjacent PID (2), and the generated PRS 2 is transmitted by the wireless communication unit 130 in the time slot S_2 as illustrated in FIG. 7.

<2-3. Processing of Device>

Next, processing of the communication device 100-1 (200-1) according to the embodiment will be described.

(A. Processing of Request Device)

Figure 9:
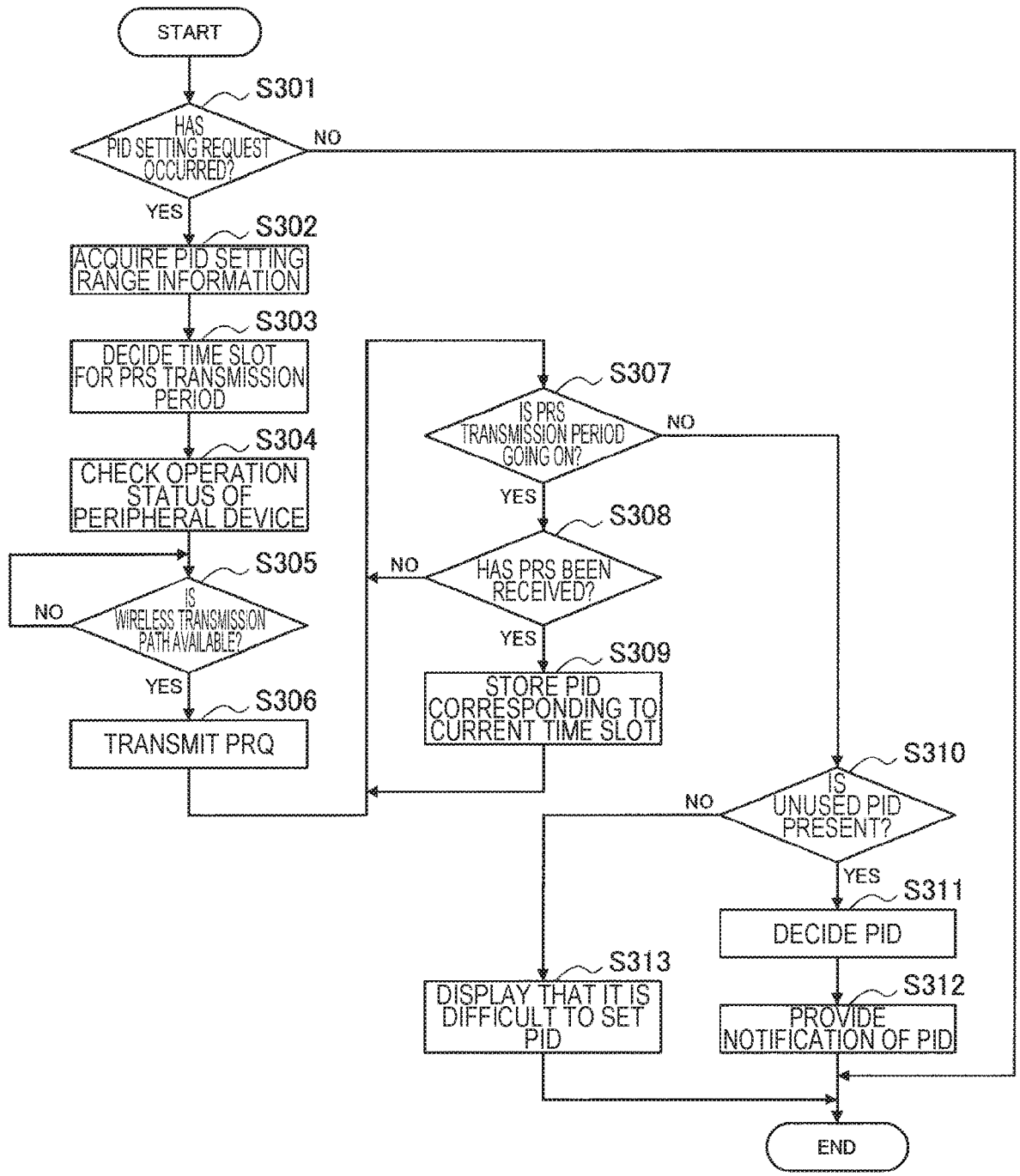
FIG. 9 is a flowchart conceptually illustrating processing of a request device according to the embodiment.

First, processing of the AP 100-1 that operates as a request device will be described with reference to FIG. 9. FIG. 9 is a flowchart conceptually illustrating processing of the request device according to the embodiment.

The AP 100-1 determines whether or not a PID setting request has occurred (Step S301). Specifically, the control unit 120 determines whether or not PID setting has been requested by another configuration of itself or an external device.

If the PID setting request has occurred, the AP 100-1 acquires PID setting range information (Step S302). Specifically, if it is determined that the PID setting request has occurred, the control unit 120 acquires the PID setting range information by which the PID that can be set is specified.

Next, the AP 100-1 decides a time slot for the PRS transmission period (Step S303). Specifically, the control unit 120 decides the number of time slots and the like in the PRS transmission period on the basis of the acquired PID setting range information. The information indicating the decided number of time slots and the like is stored as a PRS transmission parameter in the PRQ.

Next, the AP 100-1 checks an operation status of a peripheral device (Step S304). Specifically, the control unit 120 determines whether or not the peripheral STA 200-1 or OSTA 200-1 is operating, that is, whether or not the peripheral STA 200-1 or OSTA 200-1 is sleeping. Note that the operation status may be checked through estimation from a communication history until then and the like.

Next, the AP 100-1 determines whether or not a wireless transmission path is available (Step S305). Specifically, the wireless communication unit 130 determines whether or not the wireless transmission path is available by performing carrier sense processing or the like.

If it is determined that the wireless transmission path is available, the AP 100-1 transmits the PRQ (Step S306). Specifically, if it is determined that the wireless transmission path is available, the wireless communication unit 130 transmits the PRQ that the data processing unit 110 has generated on the basis of an instruction from the control unit 120.

Next, the AP 100-1 determines that the PRS transmission period is going on (Step S307). Specifically, the wireless communication unit 130 stands by until the PRS transmission period arrives after the transmission of the PRQ.

In the PRS transmission period, the AP 100-1 waits for reception of the PRS (Step S308). Specifically, the wireless communication unit 130 stands by such that the PRS can be received in the PRS transmission period.

If the PRS is received, the AP 100-1 stores the PID corresponding to the time slot at the current time (Step S309). Specifically, if the PRS is received by the wireless communication unit 130, the control unit 120 specifies the PID corresponding to the time slot in which the PRS is received and stores the specified PID.

If the PRS transmission period ends, the AP 100-1 determines whether or not there is an unused PID on the basis of the stored PID (Step S310). Specifically, the control unit 120 determines whether or not PIDs that are different from the stored PID are present in all the PIDs that can be used if the PRS transmission period ends.

If it is determined that unused PIDs are present, the AP 100-1 decides the PID from among the unused PIDs (Step S311). Specifically, the control unit 120 decides its own PID from the unused PIDs if it is determined that unused PIDs are present.

Next, the AP 100-1 transmits a PID setting notification for the decided PID (Step S312). Specifically, if its own PID has been decided, the control unit 120 causes the data processing unit 110 to generate a PID setting notification for providing a notification of the decided its own PID to the STA 200-1, and the generated PID setting notification is transmitted to the STA 200-1 that belongs to its own BSS by the wireless communication unit 130.

Note that if it is determined that no unused PID is present in Step S310, the AP 100-1 displays that it is difficult to set the PID (Step S313). Specifically, if it is determined that no unused PIDs are present, the control unit 120 stops the setting of the PID and causes the information output unit 105 to display an image or the like indicating that it is difficult to set the PID through the device control unit 103.

(B. Processing of Response Device)

Figure 10:
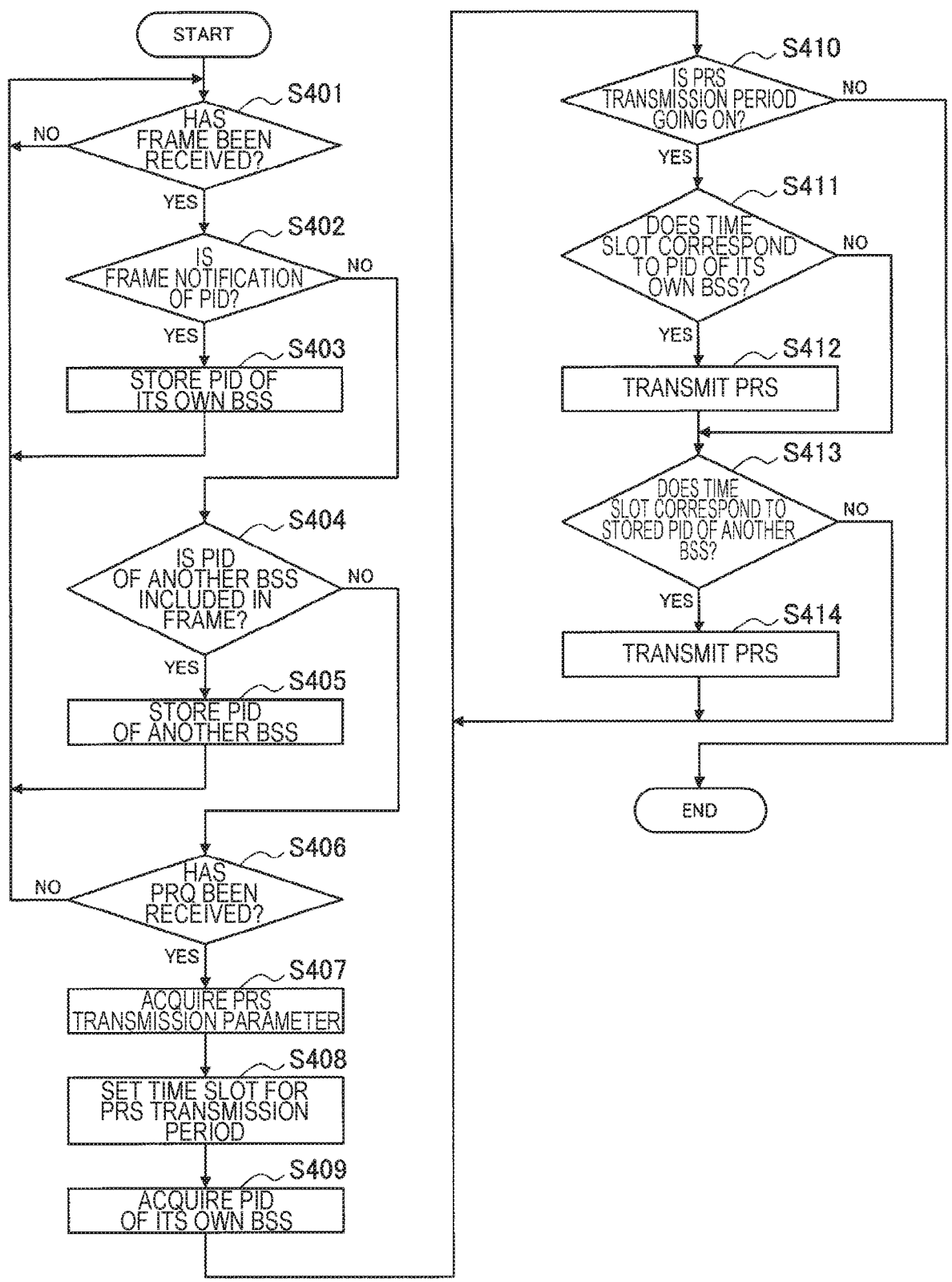
FIG. 10 is a flowchart conceptually illustrating processing of a response device according to the embodiment.

Subsequently, processing of the STA 200-1 that operates as a response device will be described with reference to FIG. 10. FIG. 10 is a flowchart conceptually illustrating processing of the response device according to the embodiment.

The STA 200-1 stands by until a frame is received (Step S401). Specifically, the wireless communication unit 230 waits for reception of the frame.

If the frame is received, the STA 200-1 determines whether or not the received frame is a PID setting notification (Step S402). Specifically, if the frame is received by the wireless communication unit 230, the data processing unit 210 determines whether or not the received frame is a PID setting notification.

If it is determined that the received frame is a PID setting notification, the STA 200-1 stores its own PID on the basis of the PID setting notification (Step S403). Specifically, the control unit 220 stores the PID that has been provided by the PID setting notification as its own PID in a case in which the received frame is a PID setting notification, In addition, if it is determined that the frame received in Step S402 is not a PID setting notification, the STA 200-1 determines whether or not the frame has a PID of another BSS (Step S404). Specifically, the data processing unit 210 determines whether or not a PLCP header or the like of the received frame has a PID of another BSS. Note that the PID of another BSS described above may be stored from a location other than the PLCP header.

If it is determined that the received frame has the PID of another BSS, the STA 200-1 stores the PID of another BSS described above as the aforementioned adjacent PID (Step S405). Specifically, in a case in which the received frame has the PID of another BSS, the control unit 220 stores the PID of another BSS described above as the adjacent PID.

In addition, if it is determined that the received frame does not have the PID of another BSS in Step S404, the STA 200-1 determines whether the received frame is a PRQ (Step S406). Specifically, the data processing unit 210 determines whether the frame is a PRQ in a case in which the received frame does not have the PID of another BSS.

If it is determined that the received frame is a PRQ, the STA 200-1 acquires the PRS transmission parameter from the PRQ (Step S407). Specifically, the data processing unit 210 acquires the PRS transmission parameter from the PRQ in a case in which the received frame is the PRQ.

Next, the STA 200-1 sets time slots for the PRS transmission period on the basis of the PRS transmission parameter (Step S408). Specifically, the control unit 220 sets the time slots for the PRS transmission period on the basis of the number of time slots or the like included in the acquired PRS transmission parameter.

Next, the STA 200-1 acquires the PID of its own BSS (Step S409). Specifically, the control unit 220 acquires the stored its own PID.

Next, the STA 200-1 determines whether or not the PRS transmission period is going on (Step S410). Specifically, the control unit 220 stands by until the PRS transmission period arrives.

In the PRS transmission period, the STA 200-1 determines whether or not the time slot corresponding to the PID of its own BSS has arrived (Step S411). Specifically, the control unit 220 determines whether or not the time slot corresponding to its own PID has arrived in the PRS transmission period.

If it is determined that the time slot corresponding to the PID of its own BSS has arrived, the STA 200-1 transmits the PRS (Step S412). Specifically, if the time slot corresponding to its own PID has arrived, the control unit 220 causes the wireless communication unit 230 to transmit the PRS that has its own PID.

In addition, the STA 200-1 determines whether or not the time slot corresponding to the stored PID of another BSS has arrived (Step S413). Specifically, the control unit 220 determines whether or not the time slot corresponding to the stored adjacent PID has arrived in the PRS transmission period.

If it is determined that the time slot corresponding to the stored PID of another BSS has arrived, the STA 200-1 transmits the PRS (Step S414). Specifically, the control unit 220 causes the wireless communication unit 230 to transmit the PRS that has the adjacent PID if the time slot corresponding to the stored adjacent PID has arrived.

2-4. Operation Example

Figure 11:
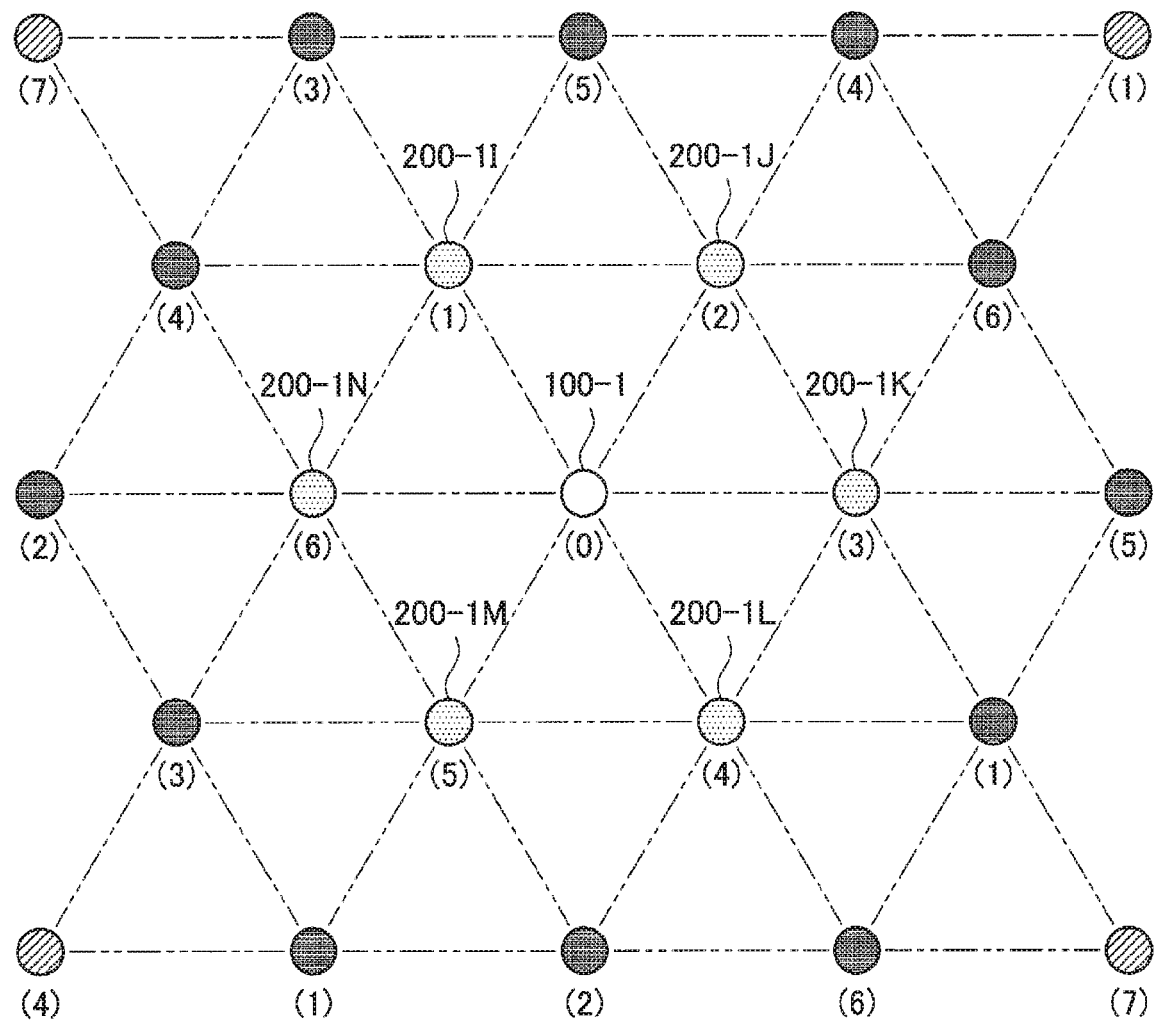
FIG. 11 is a diagram for explaining a setting example of a PID by the request device and the response device according to the embodiment.

The configurations and the processing of the request device and the response device according to the first embodiment of the present disclosure have been described above. Next, a PID setting example by the request device and the response device according to the embodiment will be described with reference to FIG. 11. FIG. 11 is a diagram for explaining a PID setting example by the request device and the response device according to the embodiment.

For example, a case in which the AP 100-1 illustrated in FIG. 11 newly sets a PID will be considered.

First, the STAs 200-1 collect the PIDs of their own BSSs and the adjacent BSSs. If frames that has PIDs have been received from OSTA 200-1K and 200-1M that are devices which belong to another BSS, for example, an OSTA 200-1L stores a PID (3) and a PID (5) that the frames have as adjacent PIDs. In addition, the OSTA 200-1L acquires a PID from a frame that is received from an AP or an STA that is located further outward than the OSTA 200-1L relative to the AP 100-1 as a center (as expressed by darker dots than the dots expressing the STA 200-1L in FIG. 11) and stores the acquired PID (1), the PID (2), and the PID (6) as adjacent PIDs.

Next, if a PID setting request has occurred, the AP 100-1 promotes the peripheral STA 200-1 to provide a notification of a PID that has already been used. For example, the AP 100-1 transmits PRQs to OSTA 200-11 to 200-1N located to be able to establish communication. Note that (0) illustrated in FIG. 11 represents that its own PID has not yet been set.

The STAs 200-1 that have received the PRQ transmit the PRSs in time slots corresponding to their own PIDs or the adjacent PIDs. For example, the OSTA 200-1L transmits the PRSs in a time slot corresponding to its own PID (4) and in time slots corresponding to the stored adjacent PIDs (1) to (3), (5), and (6). Note that in the example of FIG. 11, the PRSs are respectively transmitted by the OSTAs 200-11 to 200-1N in the time slots corresponding to the PIDs (1) to (6).

The AP 100-1 that has received the PRSs decides, as its own PID, a PID corresponding to a time slot other than the time slots in which the PRSs are received. For example, the AP 100-1 receives the PRS from the OSTAs 200-11 to 200-1N in time slots corresponding to the PID (1) to the PID (6). Meanwhile, the PID (7) remains as a PID that can be set. Therefore, the AP 100-1 decides the PID (7) as its own PID. Note that although the PID (7) has already been used in another communication device, another communication device described above is located on the outermost side relative to the AP 100-1 as a center in FIG. 11, which is not located to be able to establish communication with the OSTAs 200-11 to 200-1N. Therefore, no problems due to overlapping of the PIDs occur even if the PID of the AP 100-1 itself is used as the PID (7).

2-5. Summary of First Embodiment

According to the first embodiment of the present disclosure, the request device transmits a request signal (PRQ) for a wireless communication network identifier (PID) that is identified in a physical layer and receives a response signal (PRS) by a wireless communication resource corresponding to the PID after the transmission of the PRQ as described above. In addition, the response device receives the PRQ of the PID and transmits the PRS by the wireless communication resource corresponding to the PID after the reception of the PRQ. Here, if the PIDs overlap, an inadvertent operation of the communication device occurs in the communication using the PIDs, which leads to a decrease in opportunities of transmission by the communication device, an increase in power consumption, or the like. Therefore, although it is considered to recognize PIDs that are being used in order to avoid overlapping of the PIDs, collection of the PIDs by exchanging individual frames with the respective request devices, for example, may overload the limited wireless communication resource. Meanwhile, according to the request device and the response device of the embodiment, it is possible to reduce the amount of the wireless communication resource used for avoiding the overlapping of the PIDs as compared with a case in which the PIDs themselves are communicated, by the PIDs that are being used being specified from the wireless communication resource by which the PRS is received. Therefore, it is possible to avoid the overlapping of the wireless communication network identifiers while curbing degradation of utilization efficiency of the wireless communication resource.

In addition, the PIDs include a first PID that is used in the wireless communication network to which the PRS transmission source belongs. In addition, the response device transmits a PRS by the wireless communication resource corresponding to the first PID that is used in the wireless communication network to which the response device itself belongs. Therefore, it is possible to avoid selection of a PID with high probability that the influence of the overlapping of the PID occurs by the PIDs of the wireless communication networks to which the communication devices that can directly communicate with the request device belong being recognized. Therefore, it is possible to more reliably curb the occurrence of the influence of the overlapping of the PIDs.

In addition, the PIDs include a second PID that is used in a wireless communication network that is adjacent to the wireless communication network to which the PRS transmission source belongs. In addition, the response device receives a signal that has the second PID from another communication device and transmits a PRS by a wireless communication resource corresponding to the second PID that the received signal has. Here, if the communication device moves or a communication range is changed, there is a possibility that the adjacent relationship between the wireless communication networks may also change. In that case, a wireless communication network that can communicate indirectly with the request device, that is, a wireless communication network that is indirectly adjacent to the request device with another wireless communication network interposed therebetween can become directly adjacent to the request device in the future. Thus, it is possible to also avoid the selection of the PIDs that have a possibility that the PIDs may influence the communication in the future by the PIDs of the wireless communication networks that are indirectly adjacent to the request device being recognized as in this configuration. Therefore, it is possible to more reliably avoid the overlapping of the PIDs that may influence the communication.

In addition, the request device decides a PID other than the PIDs corresponding to the wireless communication resources by which the PRS is received as a PID of the wireless communication network to which the request device itself belongs. Therefore, it is possible to avoid the overlapping of newly set PIDs by the PID that does not overlap the PIDs of the wireless communication networks that are directly or indirectly adjacent to the request device being decided as the PID of the wireless communication network to which the request device belongs. Note that this configuration can also be applied to a case in which a PID is changed, and since the PID after the change is decided as described above in that case, it is possible to change the PID to a PID that does not overlap even if the PID overlaps before the change.

In addition, the PRQ has correspondence relation information with which the correspondence relation between the PIDs and the wireless communication resource is specified. Therefore, the request device can flexibly designate the wireless communication resource in accordance with the circumstances, a communication status, or the like of the request device itself or another communication device. Therefore, it is possible for the request device to easily receive notifications of PIDs and to more reliably collect the PIDs.

In addition, the aforementioned correspondence relation information includes information with which the number of sections or an interval of the sections is specified in accordance with the PIDs of the wireless communication resource. Therefore, in a case in which a part of the information with which the correspondence relation between the PIDs and the wireless communication resource is specified is known between the request device and the response device, it is possible to store only information that is not known in the PRQ. Therefore, the increase in the size of the PRQ is curbed, and it is thus possible to reduce the amount of the consumed wireless communication resource required for collecting the PIDs.

In addition, the request device receives a PRS with received signal intensity of equal to or greater than a threshold value. Here, the possibility that the overlapping of the PIDs has an influence decreases as the received signal intensity is lower, that is, the distance from the request device is longer. Meanwhile, there is a possibility that a signal with low received signal intensity may be a signal other than the PRS or noise. Thus, according to this configuration, it is possible to curb an inadvertent operation in the PID setting processing based on reception of the PRS by only a signal that is desired to be received as a PRS being received. Therefore, it is possible to improve accuracy of the PID that is set as its own PID.

In addition, the PID includes information for identifying a BSS in a physical layer. Therefore, it is possible to curb an inadvertent operation in reception processing based on information, such as COLOR information of an existing BSS, by the overlapping of the PID being avoided.

In addition, the aforementioned wireless communication resource includes a time. For example, the wireless communication resource is time slots. Therefore, the request device can recognize the PIDs that are being used from a time at which the PRS is received. Therefore, it is possible to specify the PIDs that are being used without the wireless communication resource related to the reception of the PRS, for example, without additional processing such as analysis of a frequency or the like.

In addition, the PRS is multiplexed in terms of a time. Therefore, it is possible to improve communication efficiency of the PRS as compared with a case in which the PRS is not multiplexed, that is, a case in which only one PRS is transmitted per a PRS transmission period. Therefore, it is possible to contribute to curb degradation of utilization efficiency of the wireless communication resource due to the collection of the PIDs.

In addition, the PRS has a PID corresponding to the wireless communication resource by which the PRS is transmitted. Therefore, it is possible to specify the PIDs that are being used not only from the wireless communication resource related to the reception of the PRS but also from the PID that the PRS has. Therefore, it is possible to improve accuracy of the PIDs that are specified by the reception of the PRS.

2-6. Modification Examples

The first embodiment of the present disclosure has been described above. Note that the embodiment is not limited to the aforementioned example. Hereinafter, modifications of the embodiment will be described.
(In Case in which Wireless Communication Resource is Frequency)

Figure 12:
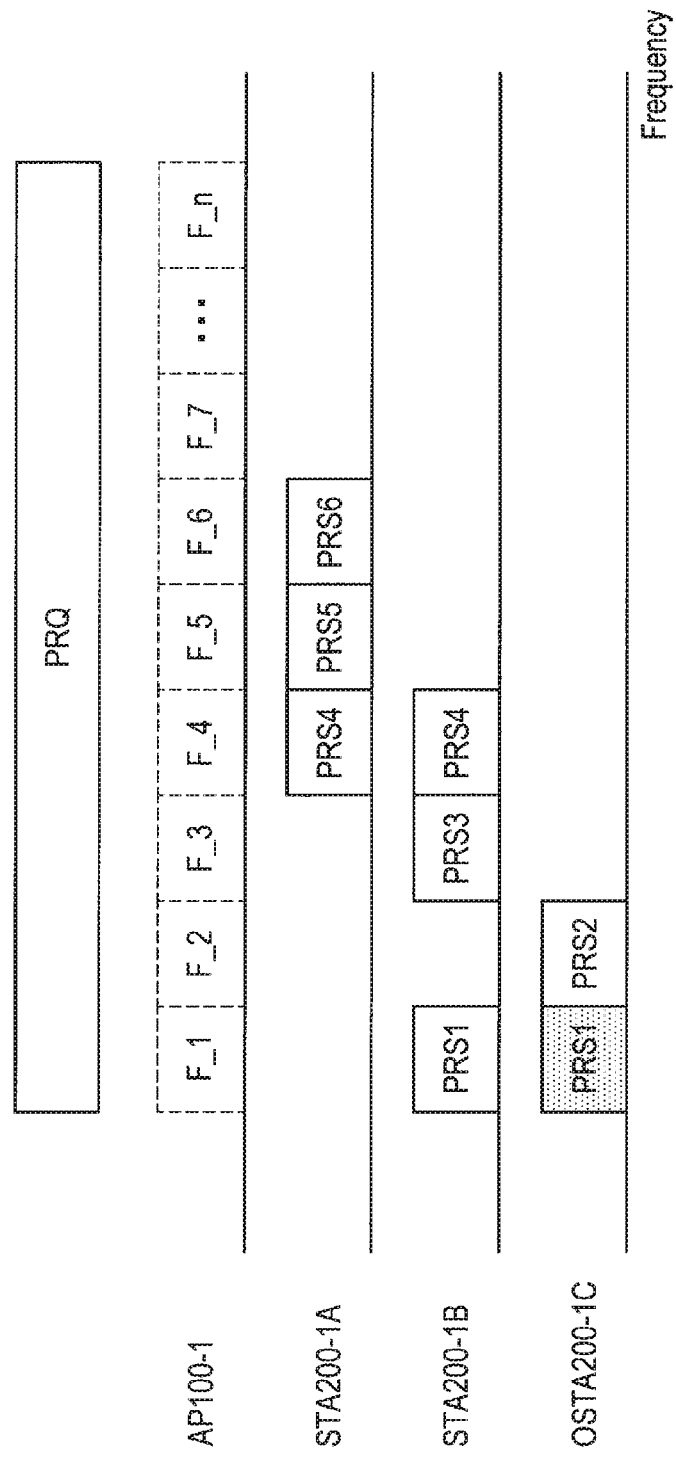
FIG. 12 is a diagram illustrating an example of communication of the PRS at a frequency corresponding to the PID according to a modification example of the embodiment.

In a modification example of the embodiment, the wireless communication resource may be a frequency. Specifically, frequency channels corresponding to PIDs are provided, and the frequency channels are orthogonal to each other. Further, communication of the PRS at frequencies corresponding to PIDs will be described with reference to FIG. 12. FIG. 12 is a diagram illustrating an example of communication of the PRS at frequencies corresponding to PIDs according to the modification example of the embodiment.

First, an available frequency is sectioned in accordance with PIDs that can be set. For example, the frequency is sectioned to frequency channels F_1 to F_n as illustrated in FIG. 12 for PID (1) to PID (n). Note that a part of the available frequency may be sectioned.

The request device transmits a PRQ that includes information indicating the number of frequency channels as a PRS transmission parameter. For example, the AP 100-1 transmits a PRQ that includes information indicating the number (n) of frequency channels such that the frequency is sectioned to F_1 to F_n as illustrated in FIG. 12.

The response device sets a transmission frequency of the PRS on the basis of the number of frequency channels indicated by information that the received PRQ has. For example, the OSTA 200-1C sets the PRS transmission frequency such that it is possible to transmit one PRS to each of F_1 to F_n as illustrated in FIG. 12.

Then, the response device transmits the PRS through a frequency channel corresponding to its own PID or an adjacent PID. For example, the OSTA 200-1C respectively transmits PRS 1 and PRS 2 through the frequency channel F_1 corresponding to its own PID (1) and the frequency channel F_2 corresponding to the adjacent PID (2) as illustrated in FIG. 12. Note that in a case in which the PRS 1 and the PRS 2 are transmitted at the same time, the PRS 1 and the PRS 2 are frequency-division-multiplexed.
(In Case in which Wireless Communication Resource is Code)

Figure 13:
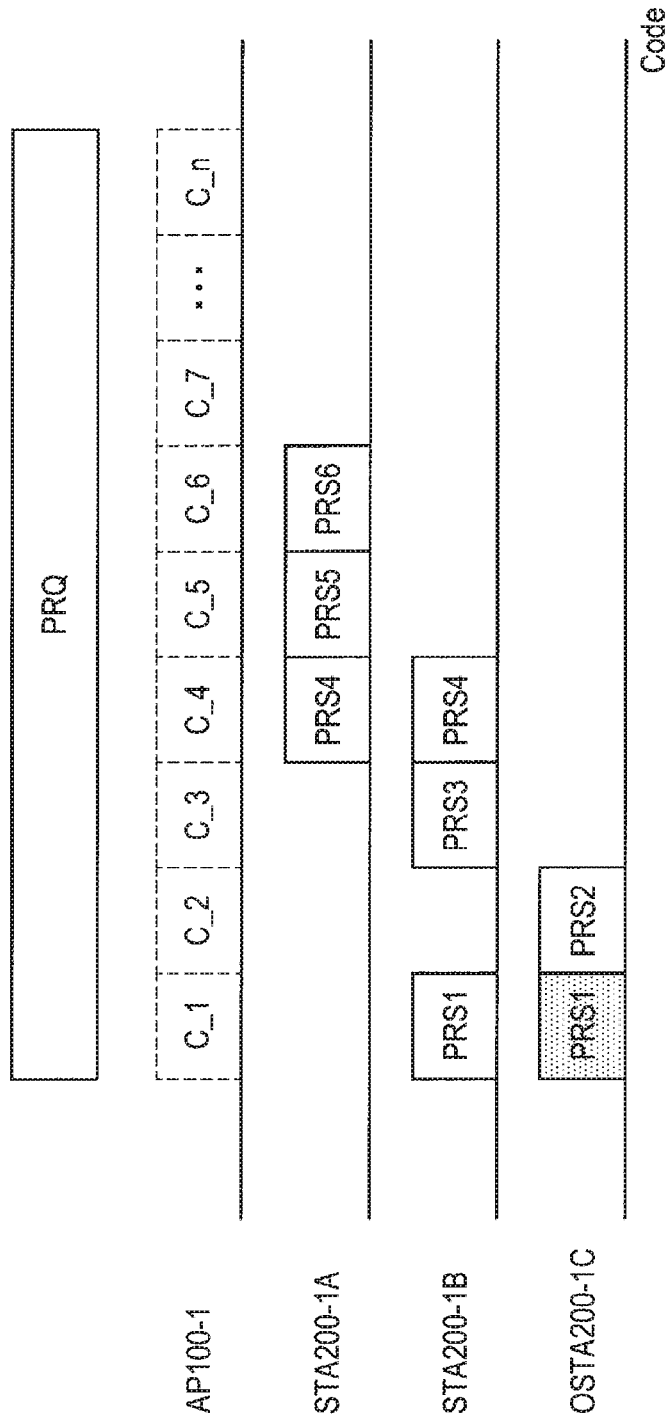
FIG. 13 is a diagram illustrating an example of communication of the PRS using a code corresponding to the PID according to a modification example of the embodiment.

In addition, the wireless communication resource may be a code. Specifically, orthogonal codes corresponding to PIDs are provided. Further, communication of a PRS using codes corresponding to PIDs will be described with reference to FIG. 13. FIG. 13 is a diagram illustrating an example of communication of the PRS using codes corresponding to PIDs according to a modification example of the embodiment.

First, codes are assigned in accordance with PIDs that can be set. For example, codes C_1 to C_n are assigned as illustrated in FIG. 12 to the PID (1) to PID (n).

The request device transmits a PRQ that includes information indicating the number of codes as a PRS transmission parameter. For example, the AP 100-1 transmits a PRQ that includes information indicating the number (n) of codes such that the codes C_1 to C_n as illustrated in FIG. 12 are assigned.

The response device sets a code that is used for transmitting the PRS on the basis of the number of codes indicated by information that the received PRQ has. For example, the OSTA 200-1C sets the code of the PRS such that it is possible to transmit one PRS for each of C_1 to C_n as illustrated in FIG. 12.

Then, the response device transmits the PRS by using a code corresponding to its own PID or an adjacent PID. For example, the OSTA 200-1C respectively transmits the PRS 1 and the PRS 2 by using the code C_1 corresponding to its own PID (1) and the code C_2 corresponding to the adjacent PID (2) as illustrated in FIG. 12. Note that in a case in which the PRS 1 and the PRS 2 are transmitted at the same time or frequency, the PRS 1 and the PRS 2 are code-division-multiplexed.

According to the modification example of the embodiment, the wireless communication resource includes a frequency or a code as described above. Therefore, it is possible to provide notifications of PIDs to the request device regardless of PRS transmission timing. Therefore, it is possible to more flexibly set the PRS transmission period. Note that the wireless communication resource may be a combination of two or more of the time, the frequency, and the code.

In addition, the PRS is multiplexed in terms of the frequency or the code. Therefore, it is possible to improve time utilization efficiency of the communication of the PRS in a case of the frequency and to improve time utilization efficiency and frequency utilization efficiency of the communication of the PRS in a case of the code.

3. Second Embodiment (Notifications of PIDs that are being Used by Types to Request Device The first embodiment of the present disclosure has been described above. Next, a second embodiment of the present disclosure will be described. Note that since a basic configuration of the embodiment is substantially the same as that of the first embodiment, the description thereof will be omitted.

3-1. Detailed Configuration of Device

Figure 14:
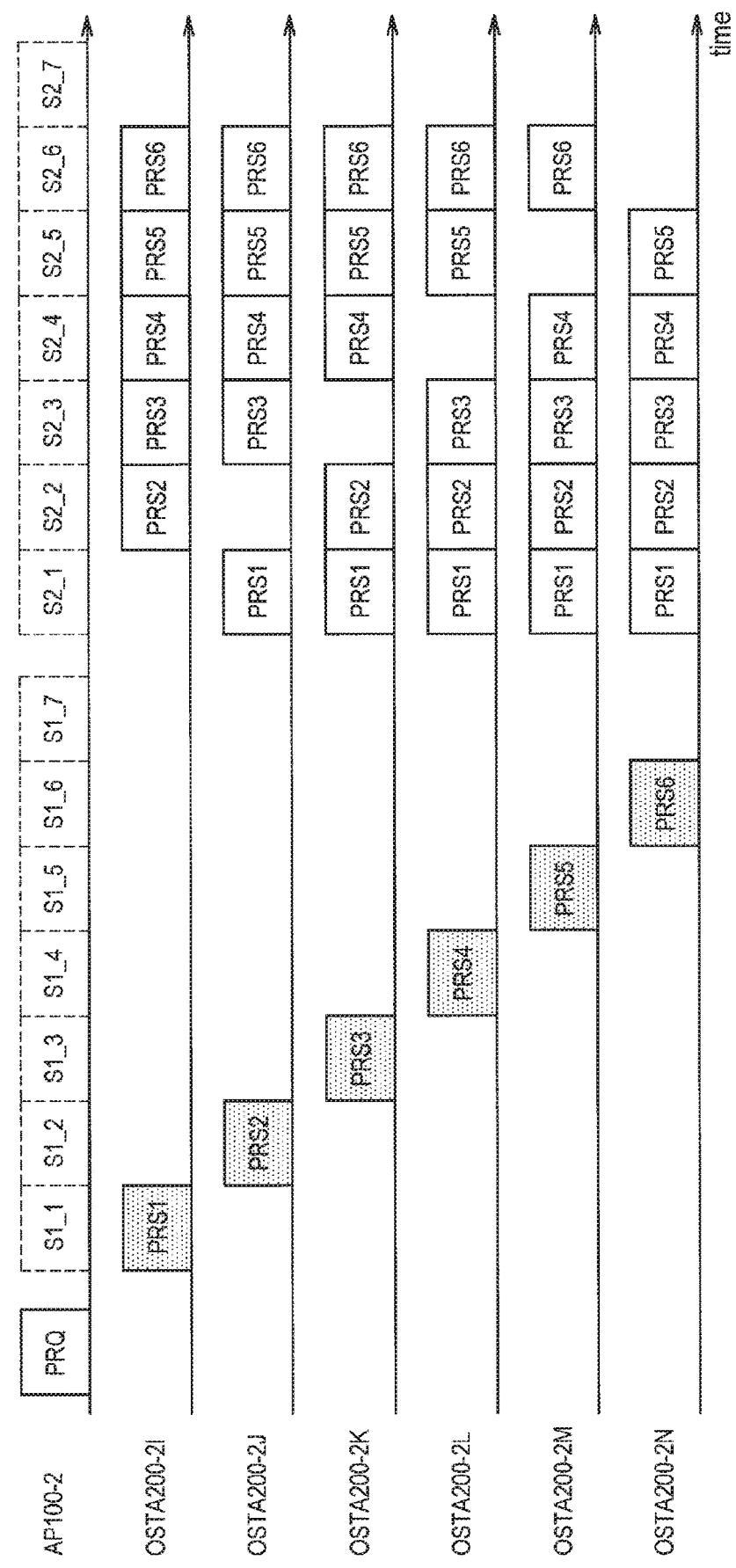
FIG. 14 is a diagram illustrating an example of communication of a PRQ and a PRS according to a second embodiment of the present disclosure.

Functional details of a communication device 100-2 according to the embodiment will be described. Hereinafter, functions of an AP 100-2 that operates as a request device and functions of an STA 200-2 that operates as a response device will be separately described in a manner similar to that in the first embodiment.
(A. Functions of Request Device)
First, functions of the AP 100-2 that operates as a request device will be described. Note that since transmission of a PRQ is substantially the same as that in the first embodiment, the description thereof will be omitted.
(A-2. Reception of PRS)
The AP 100-2 receives a PRS by a first wireless communication resource that has only a wireless communication resource corresponding to a first PID (hereinafter, also referred to as a first wireless communication resource set) and a second wireless communication resource that has only a wireless communication resource corresponding to a second PID (hereinafter, also referred to as a second wireless communication resource set). Then, the first wireless communication resource set and the second wireless communication resource set are provided so as not to overlap with each other. Note that a PID corresponding to a wireless communication resource that is a component of the first wireless communication resource set is its own PID for the response device, that is, an adjacent PID for the request device. In addition, a PID corresponding to a wireless communication resource that is a component of the second wireless communication resource set is an adjacent PID for the response device and is a PID of a BSS that is further adjacent to the BSS that is adjacent to its own BSS for the request device (hereinafter, also referred to as a remote PID). Further, reception of the PRS according to the embodiment will be described with reference to FIG. 14. FIG. 14 is a diagram illustrating an example of communication of the PRQ and the PRS according to the embodiment.

In a PRS transmission period 1 as the first wireless communication resource set after the transmission of the PRQ, the AP 100-2 first receives the PRS in units of time slots obtained by the PRS transmission period 1 being sectioned. For example, the PRS transmission period 1 is sectioned into time slots S1_1 to S1_7 as illustrated in FIG. 14, and a PRS 1 to a PRS 6 are received in the time slots S1_1 to S1_6, respectively. Note that no PRS is received in the time slot S1_7.

If the PRS is received in the PRS transmission period 1, the AP 100-2 specifies a PID corresponding to the time slot used in the communication of the PRS and stores the specified PID as an adjacent PID for the AP 100-2. For example, if the PRS 1 is received by the wireless communication unit 130 in the time slot S1_1 in the PRS transmission period 1, the control unit 120 specifies a PID (1) corresponding to the time slot equivalent to the received time. Then, the control unit 120 stores the specified PID (1) as an adjacent PID for the AP 100-2.

Subsequently, in a PRS transmission period 2 as a second wireless communication resource set after the end of the PRS transmission period 1, the AP 100-2 receives the PRS in units of time slots obtained by the PRS transmission period 2 being sectioned. For example, the PRS transmission period 2 is sectioned to time slots S2_1 to S2_7 as illustrated in FIG. 14, and five PRS 1 to PRS 5 are received in the time slots S2_1 to S2_6, respectively. Note that no PRS is received in the time slot S2_7.

If the PRS is received in the PRS transmission period 2, the AP 100-2 specifies the PID corresponding to the time slot that is used for communicating the PRS and stores the specified PID as a remote PID for the AP 100-2. If the PRS 1 is received by the wireless communication unit 130 in the time slot S2_1 in the PRS transmission period 2, for example, the control unit 120 specifies the PID (1) corresponding to the time slot equivalent to the received time. Then, the control unit 120 stores the specified PID (1) as a remote PID for the AP 100-2.

1-3. Decision of PID

The AP 100-2 decides, as its own PID, a PID other than the PIDs corresponding to the wireless communication resources, by which the PRS is received, in the first wireless communication resource set or the second wireless communication resource set. Specifically, if the PRS transmission period 2 ends, the control unit 120 decides, as its own PID, a PID that does not overlap both the adjacent PID and the remote PID stored on the basis of the reception of the PRS in the PRS transmission period 1 or the PRS transmission period 2.

Further, in a case in which no PID other than the PIDs corresponding to the wireless communication resources by which the PRS is received is present, the AP 100-2 decides, as its own PID, the PID corresponding to the wireless communication resource, by which the PRS is not received, in the PRS transmission period 1. Specifically, in a case in which a PID that does not overlap both the adjacent PID and the remote PID that are stored is not present, the control unit 120 determines whether there is a PID that does not overlap the adjacent PID. If it is determined that a PID that does not overlap with the adjacent PID is present, the control unit 120 decides the PID as its own PID. Note that if it is determined that a PID that does not overlap with the adjacent PID is also not present, the control unit 120 stops the setting of the PID.
(B. Functions of Response Device)
Subsequently, functions of the STA 200-2 (OSTA 200-2) that operates as a response device will be described. Note that since the collection of the PIDs and the reception of the PRQ are substantially the same as those in the first embodiment, the description thereof will be omitted.
(B-3. Transmission of PRS)
The STA 200-2 transmits the PRS only in the wireless communication resource corresponding to the first PID in the first wireless communication resource set. In addition, the STA 200-2 transmits the PRS only in the wireless communication resource corresponding to the second PID in the second wireless communication resource set that is provided so as not to overlap with the first wireless communication resource set. Specifically, the STA 200-2 transmits the PRS only in the time slot corresponding to its own PID in the PRS transmission period 1 and transmits the PRS only in the time slot corresponding to the adjacent PID for itself in the PRS transmission period 2. For example, the OSTA 200-2I transmits the PRS 1 in the time slot S1_1 corresponding to the PID (1), which is its own PID, in the PRS transmission period 1 as illustrated in FIG. 14. In addition, the OSTA 200-2I transmits the PRS in the time slots S2_2 to S2_6 corresponding to the PID (2) to PID (6), respectively, that are adjacent PIDs for itself in the PRS transmission period 2.

3-2. Processing of Device

Next, processing of the communication device 100-2 (200-2) according to the embodiment will be described. Note that description of processing that is substantially the same as the processing in the first embodiment will be omitted.

(A. Processing of Request Device)

Figure 15:
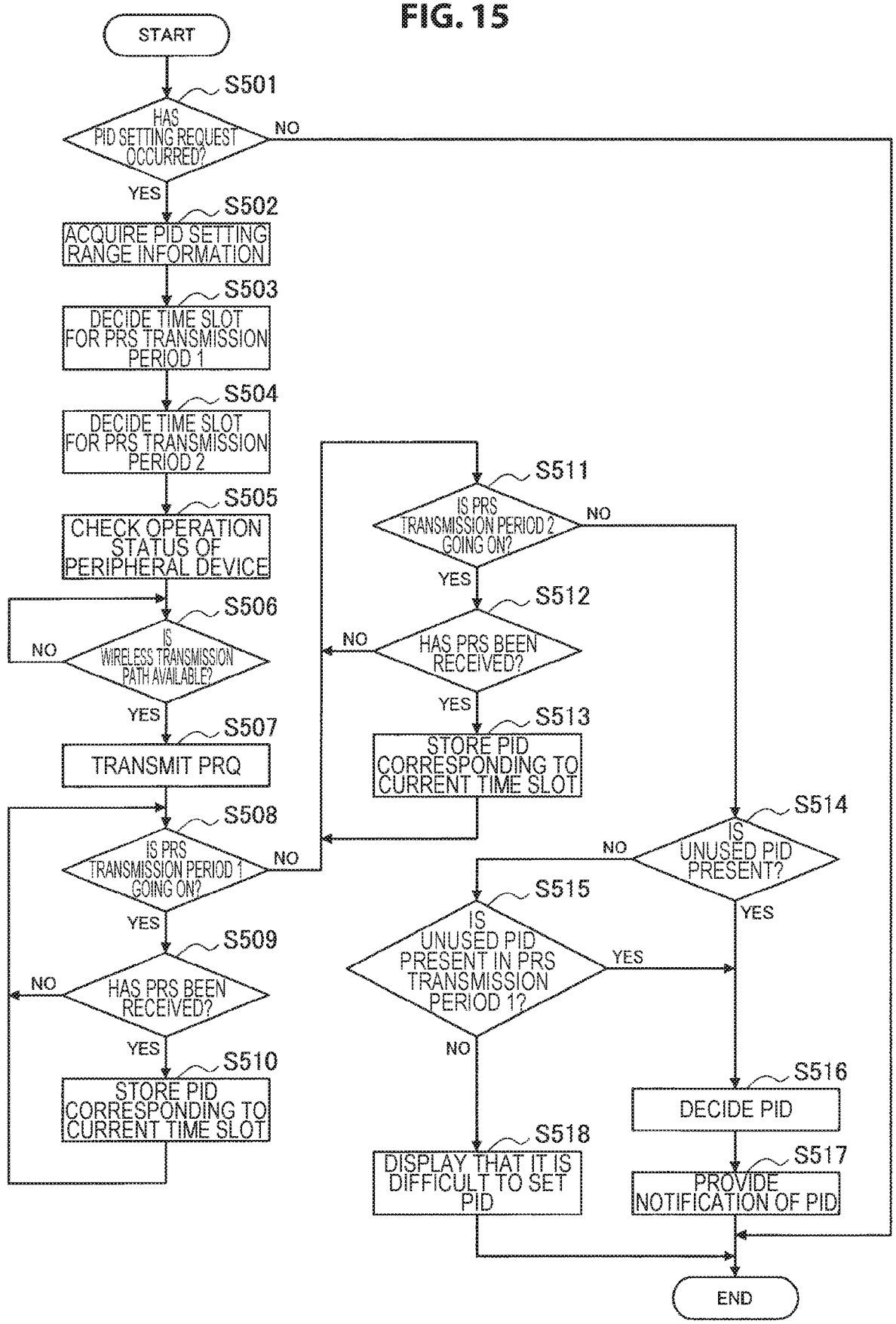
FIG. 15 is a flowchart conceptually illustrating processing of a request device according to the embodiment.

First, processing of the AP 100-2 that operates as a request device will be described with reference to FIG. 15. FIG. 15 is a flowchart conceptually illustrating processing of the request device according to the embodiment.

If a PID setting request occurs (Step S501), the AP 100-2 acquires PID setting range information (Step S502). Then, the AP 100-2 decides a time slot for the PRS transmission period 1 (Step S503) and decides a time slot for the PRS transmission period 2 (Step S504).

Next, the AP 100-2 checks an operation status of the peripheral devices (Step S505) and determines whether or not a wireless communication path is available (Step S506). If it is determined that the wireless communication path is available, the AP 100-2 transmits a PRQ (Step S507).

Next, if the PRS transmission period 1 arrives (Step S508), the AP 100-2 waits for reception of a PRS in the PRS transmission period 1 (Step S509).

If the PRS is received in the PRS transmission period 1, the AP 100-2 stores the PID corresponding to the time slot at the current time (Step S510). Specifically, if the PRS is received by the wireless communication unit 130 in the PRS transmission period 1, the control unit 120 specifies the PID corresponding to the time slot in which the PRS is received and stores the specified PID as an adjacent PID for itself.

Next, if the PRS transmission period 1 ends, and the PRS transmission period 2 arrives (Step S511), the AP 100-2 waits for reception of a PRS in the PRS transmission period 2 (Step S512).

If the PRS is received in the PRS transmission period 2, the AP 100-2 stores the PID corresponding to the time slot at the current time (Step S513). Specifically, if the PRS is received by the wireless communication unit 130 in the PRS transmission period 2, the control unit 120 specifies the PID corresponding to the time slot in which the PRS is received and stores the specified PID as a remote PID for itself.

If the PRS transmission period 2 ends, the AP 100-2 determines whether or not there is an unused PID on the basis of the stored PIDs (Step S514). Specifically, if the PRS transmission period 2 ends, the control unit 120 determines whether or not a PID that is different from both the adjacent PID and the remote PID that are stored from among all the PIDs that can be used is present.

If it is determined that no unused PID is present, the AP 100-2 determines whether or not an unused PID is present in the PRS transmission period 1 (Step S515). Specifically, in a case in which a PID that is different from both the adjacent PID and the remote PID is not present, the control unit 120 determines whether or not a PID that is different only from the adjacent PID is present.

In a case in which it is determined that an unused PID is present in Step S514, or in a case in which it is determined that an unused PID is present in the PRS transmission period 1 in Step S515, the AP 100-2 decides the PID from the unused PID (Step S516). Specifically, if it is determined that an unused PID that is different from both the adjacent PID and the remote PID is present, the control unit 120 decides its own PID from the unused PID. In addition, if it is determined that an unused PID that is different only from the adjacent PID is present, the control unit 120 decides its own PID from the unused PID.

Next, the AP 100-2 transmits a PID setting notification for the decided PID (Step S517). Note that if it is determined that no unused PID is present in Step S515, the AP 100-2 displays that it is difficult to set a PID (Step S518).

(B. Processing of Response Device)

Figure 16:
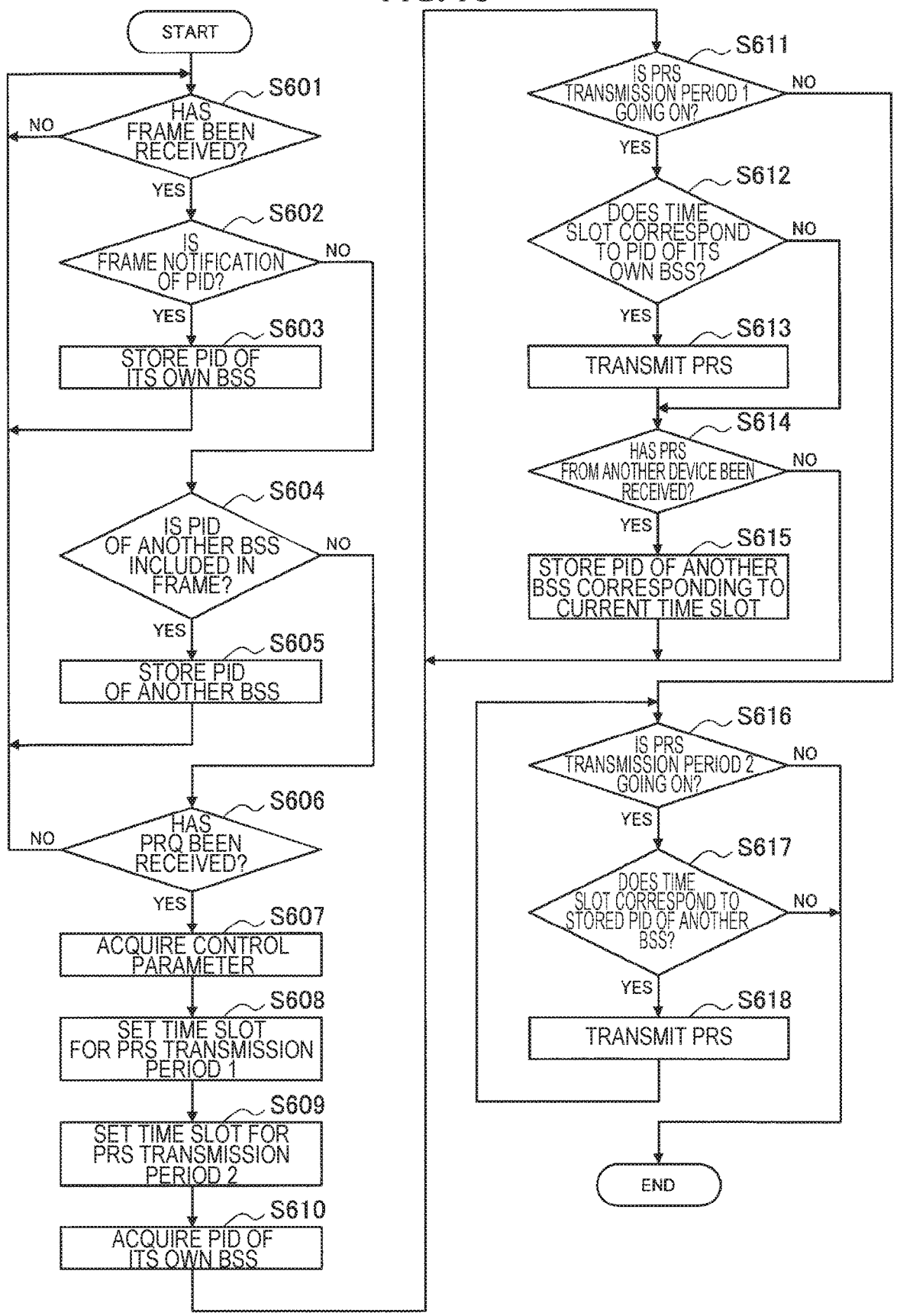
FIG. 16 is a flowchart conceptually illustrating processing of a response device according to the embodiment.

Subsequently, processing of the STA 200-2 that operates as a response device will be described with reference to FIG. 16. FIG. 16 is a flowchart conceptually illustrating processing of the response device according to the embodiment.

The STA 200-2 stands by until a frame is received (Step S601), and if the frame is received, the STA 200-2 determines whether or not the received frame is a PID setting notification (Step S602). Then, if it is determined that the received frame is a PID setting notification, the STA 200-2 stores its own PID on the basis of the PID setting notification (Step S603).

In addition, if it is determined that the received frame is not a PID setting notification in Step S602, the STA 200-2 determines whether or not the frame has a PID of another BSS (Step S604). If it is determined that the received frame has a PID of another BSS, the STA 200-2 stores the PID of another BSS described above as the adjacent PID (Step S605).

In addition, if it is determined that the received frame does not have a PID of another BSS in Step S604, the STA 200-2 determines whether or not the received frame is a PRQ (Step S606). If it is determined that the received frame is a PRQ, the STA 200-2 acquires a PRS transmission parameter from the PRQ (Step S607).

Next, the STA 200-2 sets a time slot for the PRS transmission period 1 (Step S608) and sets a time slot for the PRS transmission period 2 (Step S609), on the basis of the PRS transmission parameter. Note that one PRS transmission parameter may be applied to both the PRS transmission period 1 and the PRS transmission period 2, or PRS transmission parameters for each of the PRS transmission period 1 and the PRS transmission period 2 may be stored in the PRQ, and the PRS transmission parameters may be applied to each of the PRS transmission periods.

Next, the STA 200-2 acquires the PID of its own BSS (Step S610).

Next, if the PRS transmission period 1 arrives (Step S611), the STA 200-2 determines whether or not a time slot corresponding to the PID of its own BSS has arrived in the PRS transmission period 1 (Step S612). If it is determined that the time slot corresponding to the PID of its own BSS has arrived, the STA 200-2 transmits the PRS (Step S613). Specifically, the control unit 220 determines only whether or not the time slot corresponding to its own PID has arrived in the PRS transmission period 1, and if it is determined that the time slot corresponding to its own PID has arrived, the control unit 220 causes the wireless communication unit 230 to transmit the PRS.

In addition, if the PRS is received from another communication device in the PRS transmission period 1 (Step S614), the STA 200-2 stores a PID of another BSS corresponding to the current time slot (Step S615). Specifically, if the PRS is received from another communication device in the PRS transmission period 1, the control unit 220 specifies the PID corresponding to the time slot in which the PRS is received and stores the specified PID as an adjacent PID for itself. This is because the PRS is transmitted only in the time slot corresponding to its own PID in the PRS transmission period 1 in this embodiment.

If the PRS transmission period 1 ends, and the PRS transmission period 2 arrives (Step S616), the STA 200-2 determines whether or not a time slot corresponding to a stored PID of another BSS has arrived in the PRS transmission period 2 (Step S617). Specifically, the control unit 220 determines only whether or not the time slot corresponding to the adjacent PID has arrived in the PRS transmission period 2, and if it is determined that the time slot corresponding to the adjacent PID has arrived, the control unit 220 causes the wireless communication unit 230 to transmit the PRS.

3-3. Operation Example

Figure 17:
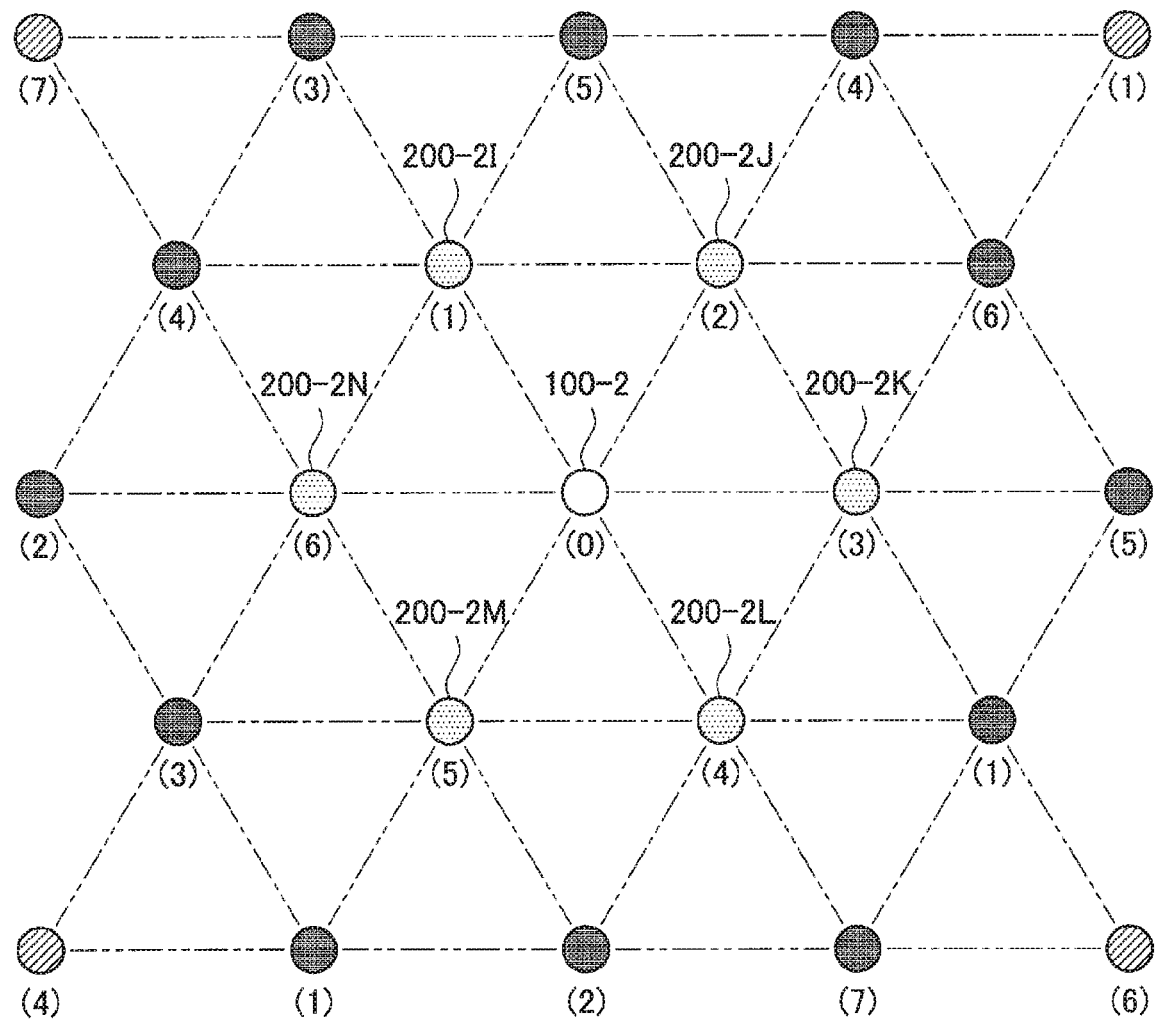
FIG. 17 is a diagram for explaining an example of setting of a PID by the request device and the response device according to the embodiment.

The configurations and the processing of the request device and the response device according to the second embodiment of the present disclosure have been described above. Next, an example of setting of a PID by the request device and the response device according to the embodiment will be described with reference to FIG. 17. FIG. 17 is a diagram for explaining an example of setting of a PID by the request device and the response device according to the embodiment.

For example, a case in which the AP 100-2 illustrated in FIG. 17 newly sets a PID will be considered. Note that detailed description of operations that are substantially the same as those in the first embodiment will be omitted.

First, the STA 200-2 collects PIDs of its own BSS and adjacent BSSs. A difference from the first embodiment is that the PID (7) instead of the PID (6) is stored as an adjacent PID in the OSTA 200-2L. That is, the PIDs stored as adjacent PIDs are PIDs (1), (2), and (7).

Next, if the PID setting request occurs, the AP 100-2 promotes the peripheral STA 200-2 to provide a notification of PIDs that have already been used.

The STA 200-2, which has received the PRQ, transmits a PRS in a time slot corresponding to its own PID in the PRS transmission period 1. For example, the OSTA 200-2L transmits the PRS only in the time slot corresponding to its own PID (4) in the PRS transmission period 1.

Next, the STA 200-2 transmits a PRS in time slots corresponding to adjacent PIDs in the PRS transmission period 2. For example, the OSTA 200-2L transmits the PRS in the time slots corresponding to the stored adjacent PIDs (1) to (3), (5), and (7) in the PRS transmission period 2.

The AP 100-2, which has received the PRS, decides, as its own PID, a PID corresponding to a time slot other than the time slots in which the PRS is received. For example, the AP 100-2 receives the PRS in time slots corresponding to the PIDs (1) to (6) from the OSTA 200-2I to 200-2N in the PRS transmission period 1. In addition, the AP 100-2 receives the PRS in each of time slots corresponding to the PIDs (1) to (7) from at least one of the OSTA 200-2I to 200-2N in the PRS transmission period 2. Since no unused PID remains in this manner, its own PID is not decided if no arrangement is employed.

Thus, the AP 100-2 further decides, as its own PID, a PID corresponding to a time slot other than the time slots in which the PRS is received in the PRS transmission period 1. For example, the AP 100-2 receives the PRS only in time slots corresponding to the PIDs (1) to (6) in the PRS transmission period 1. Therefore, the PID (7) remains as an unused PID. Therefore, the AP 100-2 decides the PID (7) as its own PID. Since the PID (7) is set by a communication device that is not located to be able to communicate directly with the AP 100-2, there is a low possibility that a problem due to overlapping of the PIDs occur even if the PID of the AP 100-2 itself is set to the PID (7).

3-4. Summary of Second Embodiment

According to the second embodiment of the present disclosure, the first wireless communication resource set that has only a wireless communication resource corresponding to the first PID and a second wireless communication resource set that has only the wireless communication resource corresponding to the second PID are provided so as not to overlap with each other as described above. In addition, the response device transmits the PRS only by the wireless communication resource corresponding to the first PID in the first wireless communication resource set and transmits the PRS only by the wireless communication resource corresponding to the second PID in the second wireless communication resource set. Therefore, the request device can distinguish the collected PIDs between the adjacent PIDs and the remote PIDs. Therefore, it is possible to more appropriately take advantage of the collected PIDs.

In addition, in a case in which no PID other than the PIDs corresponding to the wireless communication resources by which the PRS is received is present, the request device decides a PID corresponding to a wireless communication resource, by which no PRS is received, in the first wireless communication resource set as a PID of the wireless communication network to which the request device itself belongs. Therefore, even in a case in which no PID that has not been used as an adjacent PID and has not been used as a remote PID is present, the request device can set its own PID. In addition, it is possible to avoid overlapping of its own PID with the adjacent PID, the overlapping of which has a greater influence than that of the remote PID.

In addition, the signal received from another communication device described above by the response device includes a PRS received by the wireless communication resource corresponding to the first PID in the first wireless communication resource set. Therefore, the response device can collect the PIDs further on the basis of the PRS received from another response device. Therefore, it is possible to more reliably provide notifications of PIDs that have already been used in the periphery to the request device by the notifications of the PIDs being provided in an overlapping manner between the response devices when the next and subsequent collections are performed.

4. Application Example

The technology according to the present disclosure can be applied to various products. For example, the response device may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the response device may be realized as terminals that perform machine to machine (M2M) communication (also referred to as machine type communication (MTC) terminals) such as smart meters, vending machines, remotely controlled monitoring devices, or point of sale (POS) terminals. Furthermore, the response device may be wireless communication modules mounted in such terminals (for example, integrated circuit modules configured by one die).

On the other hand, for example, the request device may be realized as a wireless LAN access point (also referred to as a wireless base station) which has a router function or does not have a router function. The request device may be realized as a mobile wireless LAN router. The request device may also be a wireless communication module (for example, an integrated circuit module configured with one die) mounted on such devices.

4-1. First Application Example

Figure 18:
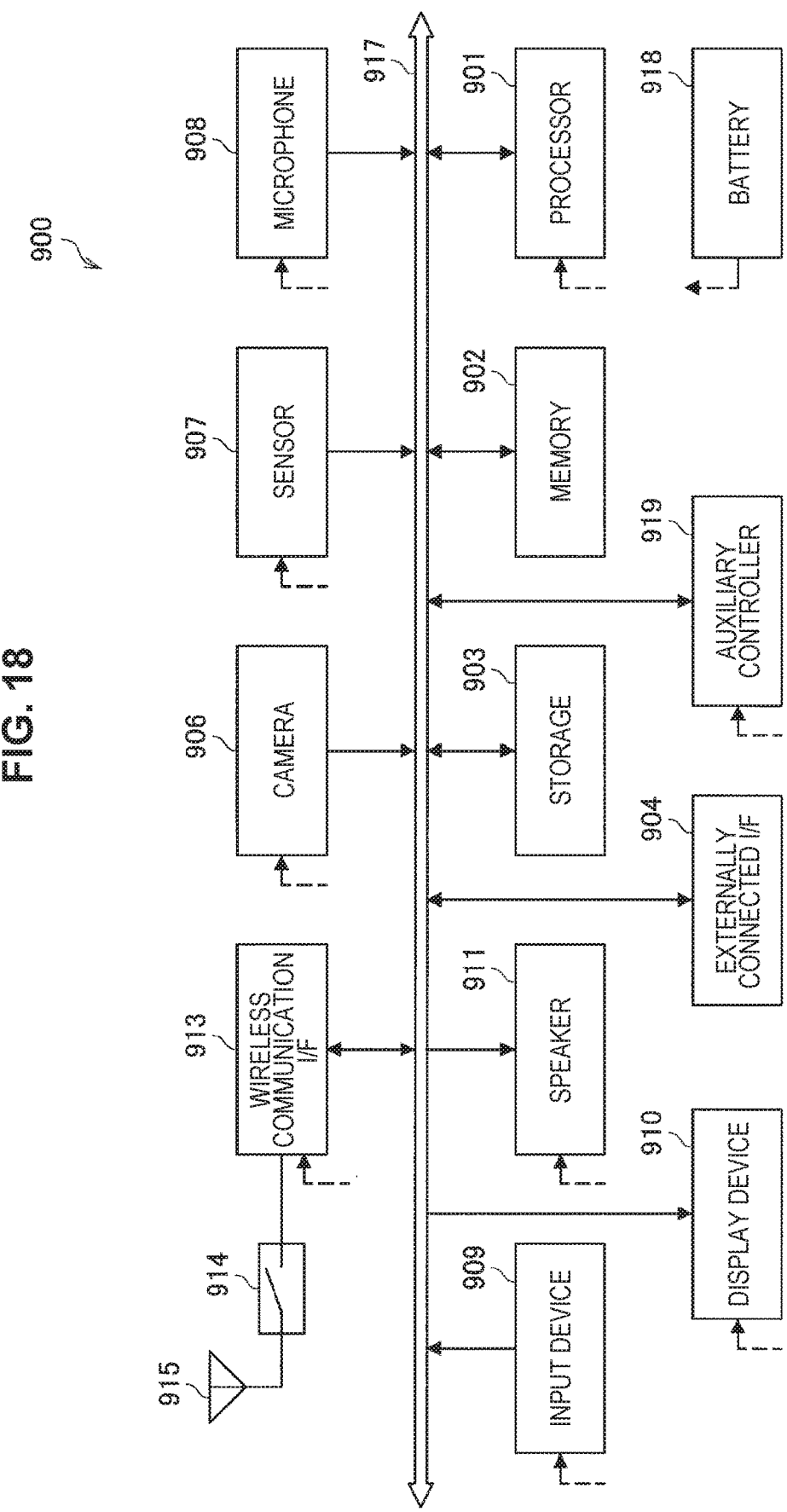
FIG. 18 is a block diagram illustrating an example of a schematic configuration of a smartphone.

FIG. 18 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 18. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 18 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 18, the data processing unit 210, the control unit 220, and the wireless communication unit 230 described above with reference to FIG. 5 may be implemented in the wireless communication interface 913. Further, at least some of the functions may be implemented in the processor 901 or the auxiliary controller 919. For example, if the PRQ is received, the control unit 220 causes the wireless communication unit 230 to transmit the PRS that the data processing unit 210 is made to generate by using the wireless communication resource corresponding to its own PID or an adjacent PID. In this manner, it is possible to avoid overlapping between the PID of the BSS to which the smartphone 900 belongs and the PID of another BSS while curbing degradation of utilization efficiency of the wireless communication resource.

Note that the smartphone 900 may operate as a wireless access point (software AP) as the processor 901 executes the function of an access point at an application level. In addition, the wireless communication interface 913 may have the function of a wireless access point.

4-2. Second Application Example

Figure 19:
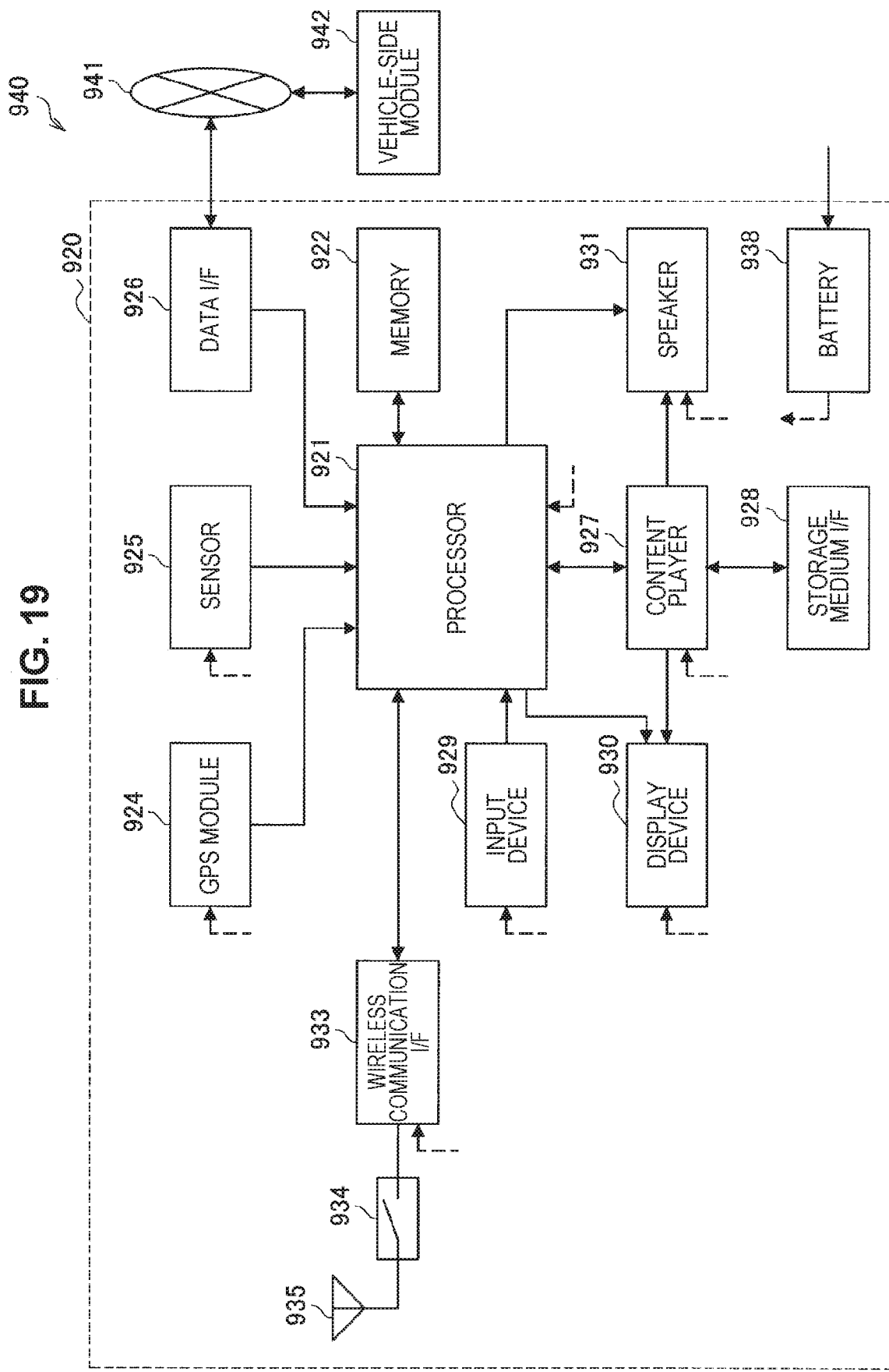
FIG. 19 is a block diagram illustrating an example of a schematic configuration of a car navigation device.

FIG. 19 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 19. In this case, the antenna switch 934 may be omitted from the configuration of the car navigation device 920.

The battery 938 supplies electric power to each of the blocks of the car navigation device 920 illustrated in FIG. 19 via power supply lines partially indicated by dashed lines in the drawing. In addition, the battery 938 accumulates electric power supplied from the vehicle side.

In the car navigation device 920 illustrated in FIG. 19, the data processing unit 210, the control unit 220, and the wireless communication unit 230 described above with reference to FIG. 5 may be implemented in the wireless communication interface 933. Further, at least some of the functions may be implemented in the processor 921. For example, if the PRQ is received, the control unit 220 causes the wireless communication unit 230 to transmit the PRS that the data processing unit 210 is made to generate by using the wireless communication resource corresponding to its own PID or an adjacent PID. In this manner, it is possible to avoid overlapping between the PID of the BSS to which the car navigation device 920 belongs and the PID of another BSS while curbing degradation of utilization efficiency of the wireless communication resource.

In addition, the wireless communication interface 933 may operate as the aforementioned request device and provide wireless connection to a terminal that a user who is in a vehicle has. At that time, the control unit 120 causes the wireless communication unit 130 to transmit the PRS related to the notification of the PID, and the wireless communication unit 130 receives the PRS by the wireless communication resource corresponding to the PID after the transmission of the PRS, for example. In this manner, it is possible to avoid the overlapping between the PID of the BBS that the car navigation device 920 constructs, that is, its own BSS and the PID of another BBS while curbing degradation of utilization efficiency of the wireless communication resource.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

4-3. Third Application Example

Figure 20:
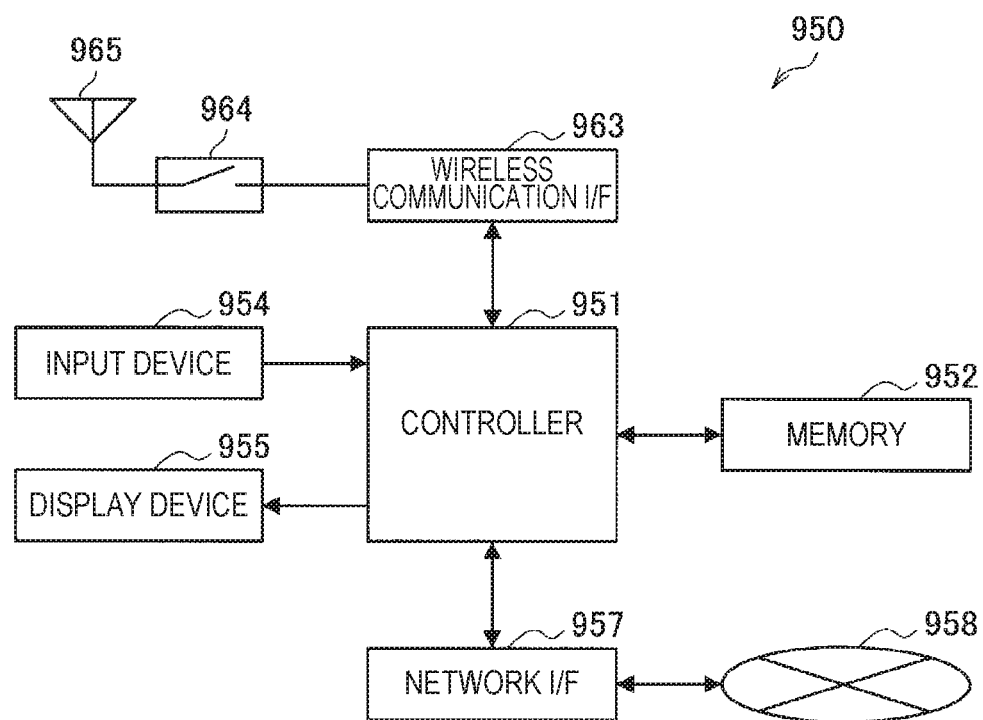
FIG. 20 is a block diagram illustrating an example of a schematic configuration of a wireless access point.

FIG. 20 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 20, the data processing unit 110, the control unit 120, and the wireless communication unit 130 described above with reference to FIG. 5 may be implemented in the wireless communication interface 963. Further, at least some of the functions may be implemented in the controller 951. For example, the control unit 120 causes the wireless communication unit 130 to transmit the PRS for a notification of the PID, and the wireless communication unit 130 receives the PRS by the wireless communication resource corresponding to the PID after the transmission of the PRS. In this manner, it is possible to avoid overlapping between the PID of the BSS that the wireless access point 950 constructs, that is, its own BSS and the PID of another BSS while curbing degradation of utilization efficiency of the wireless communication resource.

5. Conclusion

As described above, according to the first embodiment of the present disclosure, it is possible to reduce the amount of the used wireless communication resource, which is required for avoiding the overlapping of the PIDs, as compared with a case in which the PIDs themselves are communicated by specifying the PIDs that are being used in the wireless communication resource by which the PRS is received. Therefore, it is possible to avoid the overlapping of the wireless communication network identifiers while curbing degradation of utilization efficiency of the wireless communication resource.

In addition, according to the second embodiment of the present disclosure, the request device can distinguish the collected PIDs into adjacent PIDs and remote PIDs. Therefore, it becomes possible to more appropriately take advantage of the collected PIDs.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the AP 100 operates as a request device and the STA 200 (OSTA 200) operates as a response device in the aforementioned embodiment, the present technique is not limited to such an example. For example, the STA 200 (OSTA 200) may operate as a request device, and the AP 100 may operate as a response device.

In addition, although the example in which the wireless communication resource corresponding to the PIDs is a wireless communication resource that is obtained by the sectioning in accordance with the PIDs of the continuous wireless communication resource has been described in the aforementioned embodiment, the wireless communication resource corresponding to the PIDs may be a discontinuously assigned wireless communication resource. For example, the time slots corresponding to the PIDs may not be temporally adjacent to each other, and an interval may be provided between the time slots, for example. In addition, the interval may be a regular or irregular interval.

In addition, although the example in which the PRSs are transmitted by the respective wireless communication resources that correspond to both its own PID and the adjacent PID has been described in the aforementioned embodiment, the wireless communication resource by which the PRSs are transmitted may be only its own PID or the adjacent PID. For example, the request device may designate the types of PIDs (its own PID and the adjacent PID) as PRS transmission targets by using the PRQ.

In addition, although the example in which two PRS transmission periods are provided has been described in the aforementioned second embodiment, three or more PRS transmission periods may be provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, it is also possible to produce a computer program for causing hardware incorporated in a request device or a response device to exhibit functions equivalent to those of the respective logic configurations of the aforementioned request device or response device. In addition, a storage medium that stores the computer program therein is also provided.

Additionally, the present technology may also be configured as below.

(1)

A communication device including:

a communication unit that transmits a request signal for a wireless communication network identifier identified in a physical layer and receives a response signal by a wireless communication resource corresponding to the wireless communication network identifier after the transmission of the request signal.

(2)

The communication device according to (1), in which the wireless communication network identifier includes a first wireless communication network identifier that is used in a wireless communication network to which a transmission source of the response signal belongs.

(3)

The communication device according to (2), in which the wireless communication network identifier includes a second wireless communication network identifier that is used in a wireless communication network that is adjacent to the wireless communication network to which the transmission source of the response signal belongs.

(4)

The communication device according to (3), in which a first wireless communication resource that only includes a wireless communication resource corresponding to the first wireless communication network identifier and a second wireless communication resource that only includes a wireless communication resource corresponding to the second wireless communication network identifier are provided so as not to overlap each other.

(5)

The communication device according to (4), in which the communication unit decides a wireless communication network identifier other than the wireless communication network identifier corresponding to the wireless communication resource by which the response signal has been received, as the wireless communication network identifier of a wireless communication network to which the communication device belongs.

(6)

The communication device according (5), in which the communication unit decides a wireless communication network identifier corresponding to a wireless communication resource by which the response signal has not been received in the first wireless communication resource, as the wireless communication network identifier of a wireless communication network to which the communication device belongs, in a case in which the wireless communication network identifier other than the wireless communication network identifier corresponding to the wireless communication resource by which the response signal has been received is not present.

(7)

The communication device according to any one of (1) to (6), in which the request signal includes correspondence relation information by which correspondence relation between the wireless communication network identifier and the wireless communication resource is specified.

(8)

The communication device according to (7), in which the correspondence relation information includes information by which a number of sections or an interval between the sections according to the wireless communication network identifier of the wireless communication resource is specified.

(9)

The communication device according to any one of (1) to (8), in which the communication unit receives the response signal with a received signal strength of a threshold value or more.

(10)

The communication device according to any one of (1) to (9), in which the wireless communication network identifier includes information for identifying a basic service set (BSS) in a physical layer.

(11)

The communication device according to any one of (1) to (10), in which the wireless communication resource includes a time, a frequency, or a code.

(12)

The communication device according to (11), in which the response signal is multiplexed in terms of a time, a frequency, or a code.

(13)

A communication device including:

a communication unit that receives a request signal for a wireless communication network identifier identified in a physical layer and transmits a response signal by a wireless communication resource corresponding to the wireless communication network identifier after the reception of the request signal.

(14)

The communication device according to (13), in which the communication unit transmits the response signal by a wireless communication resource corresponding to a first wireless communication network identifier that is used in a wireless communication network to which the communication device belongs.

(15)

The communication device according to (14), in which the communication unit receives a signal that includes a second wireless communication network identifier from another communication device and transmits the response signal by a wireless communication resource corresponding to the second wireless communication network identifier included in the received signal.

(16)

The communication device according to (15), in which the communication unit transmits the response signal only by a wireless communication resource corresponding to the first wireless communication network identifier in a first wireless communication resource, and transmits the response signal only by a wireless communication resource corresponding to the second wireless communication network identifier in a second wireless communication resource that is provided so as not to mutually overlap the first wireless communication resource.

(17)

The communication device according to (16), in which a signal received from the other communication device includes the response signal received from the other communication device in a wireless communication resource corresponding to the first wireless communication network identifier in the first wireless communication resource.

(18)

The communication device according to any one of (13) to (17), in which the response signal includes the wireless communication network identifier corresponding to a wireless communication resource by which the response signal is transmitted.

(19)

A communication method including, by using a processor:

transmitting a request signal for a wireless communication network identifier identified in a physical layer; and receiving a response signal by a wireless communication resource corresponding to the wireless communication network identifier after the transmission of the request signal.

(20)

A communication method including, by using a processor:

receiving a request signal for a wireless communication network identifier identified in a physical layer; and transmitting a response signal by a wireless communication resource corresponding to the wireless communication network identifier after the reception of the request signal.

(21)

A program for causing a computer to execute:

a function of transmitting a request signal for a wireless communication network identifier identified in a physical layer; and a function of receiving a response signal by a wireless communication resource corresponding to the wireless communication network identifier after the transmission of the request signal.

(22)

A program for causing a computer to execute:

a function of receiving a request signal for a wireless communication network identifier identified in a physical layer; and a function of transmitting a response signal by a wireless communication resource corresponding to the wireless communication network identifier after the reception of the request signal.

REFERENCE SIGNS LIST

100 AP
110, 210 data processing unit
120, 220 control unit
130, 230 wireless communication unit
200 STA, OSTA

The invention claimed is:

1. A communication device, comprising:
a central processing unit (CPU) configured to:
transmit a request signal for a specific wireless communication network identifier of a plurality of wireless communication network identifiers, wherein
the transmitted request signal comprises a correspondence relation between the plurality of wireless communication network identifiers and a plurality of wireless communication resources, and
the specific wireless communication network identifier is identified in a physical layer; and
receive a response signal by a specific wireless communication resource of the plurality of wireless communication resources based on the transmitted request signal, wherein
the specific wireless communication resource corresponds to the specific wireless communication network identifier.

2. The communication device according to claim 1, wherein
the plurality of wireless communication network identifiers includes a first wireless communication network identifier,
the first wireless communication network identifier corresponds to a first wireless communication network of a plurality of wireless communication networks, and
a transmission source of the response signal belongs to the first wireless communication network.

3. The communication device according to claim 2, wherein
the plurality of wireless communication network identifiers further includes a second wireless communication network identifier,
the second wireless communication network identifier corresponds to a second wireless communication network of the plurality of wireless communication networks, and
the second wireless communication network is adjacent to the first wireless communication network.

4. The communication device according to claim 3, wherein
a first wireless communication resource of the plurality of wireless communication resources corresponds to the first wireless communication network identifier and a second wireless communication resource of the plurality of wireless communication resources corresponds to the second wireless communication network identifier, and
the first wireless communication resource is different from the second wireless communication resource.

5. The communication device according to claim 4, wherein
the CPU is further configured to determine a third wireless communication network identifier of the plurality of wireless communication network identifiers,
the third wireless communication network identifier is different from the specific wireless communication network identifier,
the determined wireless communication network identifier corresponds to a third wireless communication network of the plurality of wireless communication networks, and
the communication device belongs to the third wireless communication network.

6. The communication device according to claim 5, wherein
the CPU is further configured to determine a fourth wireless communication network identifier of the plurality of wireless communication network identifiers based on an unavailability of the third wireless communication network identifier,
the fourth wireless communication network identifier corresponds to a third wireless communication resource,
the third wireless communication resource is different from the specific wireless communication resource,
the fourth wireless communication network identifier corresponds to a fourth wireless communication network, and
the communication device belongs to the fourth wireless communication network.

7. The communication device according to claim 1, wherein
the request signal includes correspondence relation information,
the correspondence relation information specifies the correspondence relation, and
the correspondence relation information includes information of at least one of a number of sections or an interval between the sections corresponding to the specific wireless communication network identifier of the specific wireless communication resource.

8. The communication device according to claim 1, wherein the CPU is further configured to receive the response signal based on a signal strength of the response signal that is equal to or greater than a threshold value.

9. The communication device according to claim 1, wherein each wireless communication network identifier of the plurality wireless communication network identifiers includes information for identification of a basic service set (BSS) in the physical layer.

10. The communication device according to claim 1, wherein each wireless communication resource of the plurality of wireless communication resources includes one of a time, a frequency, or a code.

11. The communication device according to claim 10, wherein the response signal is multiplexed based on the one of the time, the frequency, or the code.

12. A first communication device, comprising:
a central processing unit (CPU) configured to:
receive a request signal for a first wireless communication network identifier of a plurality of wireless communication network identifiers, wherein
the received request signal comprises a correspondence relation between the plurality of wireless communication network identifiers and a plurality of wireless communication resources, and the first wireless communication network identifier is identified in a physical layer; and transmit a response signal by a first wireless communication resource of the plurality of wireless communication resources based on the received request signal, wherein the first wireless communication resource corresponds to the first wireless communication network identifier.

13. The first communication device according to claim 12, wherein the first wireless communication network identifier corresponds to a wireless communication network, and the first communication device belongs to the wireless communication network.

14. The first communication device according to claim 13, wherein the CPU is further configured to:

receive a signal from a second communication device other than the first communication device, the signal includes a second wireless communication network identifier of the plurality of wireless communication network identifiers, and transmit the response signal by a second wireless communication resource of the plurality of wireless communication resources corresponding to the second wireless communication network identifier.

15. The first communication device according to claim 14, wherein the CPU is further configured to:

transmit the response signal by the first wireless communication resource and the second wireless communication resource, and the first wireless communication resource is different from the second wireless communication resource.

16. The first communication device according to claim 12, wherein the response signal includes the first wireless communication network identifier corresponding to the first wireless communication resource.

17. A communication method, comprising:

in a communication device that comprises a processor:

transmitting, by the processor, a request signal for a specific wireless communication network identifier of a plurality of wireless communication network identifiers, wherein the transmitted request signal comprises a correspondence relation between the plurality of wireless communication network identifiers and a plurality of wireless communication resources, and the specific wireless communication network identifier is identified in a physical layer; and receiving, by the processor, a response signal by a specific wireless communication resource of the plurality of wireless communication resources based on the transmitted request signal, wherein the specific wireless communication resource corresponds to the specific wireless communication network identifier.

18. A communication method, comprising:

in a communication device that comprises a processor:

receiving, by the processor, a request signal for a specific wireless communication network identifier of a plurality of wireless communication network identifiers, wherein the received request signal comprises a correspondence relation between the plurality of wireless communication network identifiers and a plurality of wireless communication resources, and the specific wireless communication network identifier is identified in a physical layer; and transmitting, by the processor, a response signal by a specific wireless communication resource of the plurality of wireless communication resources based on the received request signal, wherein the specific wireless communication resource corresponds to the specific wireless communication network identifier.

\* \* \* \* \*